(12) United States Patent
Kiyanclar et al.

(10) Patent No.: US 12,149,509 B2
(45) Date of Patent: Nov. 19, 2024

(54) TECHNIQUES FOR TRANSFERRING DATA ACROSS AIR GAPS

(71) Applicant: Oracle International Corporation, Redwood Shores, CA (US)

(72) Inventors: Nadir Kiyanclar, Seattle, WA (US); Caleb Dockter, Bellevue, WA (US); Erik Joseph Miller, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 332 days.

(21) Appl. No.: 17/152,610

(22) Filed: Jan. 19, 2021

(65) Prior Publication Data
US 2021/0226929 A1    Jul. 22, 2021

Related U.S. Application Data

(60) Provisional application No. 62/963,481, filed on Jan. 20, 2020.

(51) Int. Cl.
*H04L 9/40* (2022.01)
*H04L 9/32* (2006.01)

(52) U.S. Cl.
CPC ........ *H04L 63/0428* (2013.01); *H04L 9/3247* (2013.01); *H04L 63/0245* (2013.01)

(58) Field of Classification Search
CPC .......................... H04L 63/0428; H04L 9/3247
USPC .......................................................... 726/3
See application file for complete search history.

(56) References Cited

U.S. PATENT DOCUMENTS

| | | | | |
|---|---|---|---|---|
| 9,734,476 | B2 * | 8/2017 | Dubbels | G16H 30/20 |
| 10,805,340 | B1 * | 10/2020 | Goradia | H04L 63/145 |
| 10,897,414 | B1 * | 1/2021 | Al-Rushaid | H04L 45/026 |
| 11,687,355 | B1 * | 6/2023 | Mukherjee | H04L 67/10 |
| | | | | 709/221 |
| 2004/0082385 | A1 * | 4/2004 | Silva | G07F 17/3202 |
| | | | | 463/40 |
| 2013/0046547 | A1 * | 2/2013 | Drucker | G06Q 10/00 |
| | | | | 705/1.1 |
| 2014/0139732 | A1 * | 5/2014 | Mraz | H04L 63/0236 |
| | | | | 348/720 |
| 2015/0012751 | A1 * | 1/2015 | Forster | H04L 63/029 |
| | | | | 713/171 |
| 2017/0048259 | A1 * | 2/2017 | Dodge | H04L 63/168 |
| 2017/0149568 | A1 * | 5/2017 | LaGrone | G06F 12/1408 |

(Continued)

*Primary Examiner* — Dant B Shaifer Harriman
(74) *Attorney, Agent, or Firm* — Kilpatrick Townsend & Stockton LLP

(57) ABSTRACT

Techniques for transferring data to a secure computing region that is isolated from any public networks is disclosed. In some embodiments, one or more artifacts for the secure computing region are packaged. As part of the packaging, one or more data packets and metadata for the one or more artifacts can be generated. The metadata indicates corresponding destination components for the one or more artifacts within the secure computing region. The data packet(s) are received and transmitted by a first data diode endpoint device. The first data diode endpoint device is configured to transmit data to the secure computing region via a second data diode endpoint device, the second data diode endpoint device being configured to restrict data from being transmitted to a destination outside of the secure computing region. The transmission of the one or more data packets may be monitored by the system.

19 Claims, 17 Drawing Sheets

(56) References Cited

U.S. PATENT DOCUMENTS

| | | | |
|---|---|---|---|
| 2018/0137284 A1* | 5/2018 | Oh | G06F 21/64 |
| 2020/0272734 A1* | 8/2020 | Tora | G06F 21/565 |
| 2020/0371828 A1* | 11/2020 | Chiou | G06F 11/0793 |
| 2021/0132980 A1* | 5/2021 | Thakkar | H04L 67/34 |
| 2023/0401088 A1* | 12/2023 | Poddar | G06F 8/71 |
| 2024/0056507 A1* | 2/2024 | Schuller | H04L 67/34 |

* cited by examiner flock id: example-flock-id
artifact name: test-service
artifact tag: 1.0.812
artifact type: POP
application: application-alias
artifact destination: region_1

FIG. 8

| Field | Type | Required | Description |
|---|---|---|---|
| RequestID | string | true | A unique identifier for the request |
| TransferType | string | false | Package, Multipart, MultipartCommit |
| TransferID | string | false | For a single part request, can be omitted, or same as RequestId. For a multi-part request this allows the correlation of parts for a multi-part package |
| PartNumber | integer | false | Sequence number for a multipart transfer |
| Started | string | true | Timestamp for transfer start |
| Completed | string | true | Timestamp for transfer complete |
| Status | string | true | Succeeded, Failed, etc. |

FIG. 10

| Field | Type | Required | Description |
|---|---|---|---|
| RequestID | string | true | A unique identifier for the request |
| TransferType | string | false | Package, Multipart, MultipartCommit |
| TransferID | string | false | For a single part request, can be omitted, or same as RequestId. For a multi-part request this allows the correlation of parts for a multi-part package |
| PartNumber | integer | false | Sequence number for a multipart transfer |
| Started | string | true | Timestamp for transfer start |
| Completed | string | true | Timestamp for transfer complete |
| Status | string | true | Ingested, Succeeded, Failed, Staged, Pending, etc. |
| StagingAddress | string | false | For requests in staged state, URL where the artifact is being staged |

FIG. 11

TECHNIQUES FOR TRANSFERRING DATA ACROSS AIR GAPS

CROSS-REFERENCE TO RELATED APPLICATIONS

The present application is a non-provisional application of, and claims the benefit and priority under 35 U.S.C. 119 (e) to U.S. Provisional Application No. 62/963,481, filed Jan. 20, 2020, entitled "TECHNIQUES FOR TRANSFERRING DATA ACROSS AIR GAPS", the entire contents of which are incorporated by reference for all purposes.

BACKGROUND

Today, cloud infrastructure services utilize many individual services to provision and deploy code and configuration (respectively) across the cloud infrastructure service's many regions. These tools require significant manual effort to use, especially given that provisioning is generally declarative and deploying code is imperative. Additionally, as the number of service teams and regions grows, the cloud infrastructure service will need to continue to grow. Some cloud infrastructure service's strategies of deploying to a larger number of smaller regions includes per-region expenditures, which may not scale well. Some regions are restricted in a variety of ways to ensure a heightened degree of security. Conventional techniques do not meet the restrictions of these types of region. The techniques disclosed herein address these failings.

BRIEF SUMMARY

Techniques for transferring data across an air gap (e.g., between a unsecured computing environment and a secure computing region) is disclosed. In some embodiments, a method is disclosed. The method may include packaging one or more artifacts for a secure computing region that is isolated from any public networks. The packaging can comprise generating one or more data packets and metadata for the one or more artifacts. In some embodiments, the metadata indicates one or more destination components for the one or more artifacts within the secure computing region. The method may further include receiving, by a first data diode endpoint device, the one or more data packets comprising the one or more artifacts and metadata. In some embodiments, the first data diode endpoint device may be configured to transmit data to the secure computing region via a second data diode endpoint device. In some embodiments, the second data diode endpoint device is configured to restrict data from being transmitted to a destination outside of the secure computing region. The method may further include transmitting, by the first data diode endpoint device, the one or more packets to the second data diode endpoint device in one or more data packets, The method may further include monitoring, by the first data diode endpoint device, transmission of the one or more artifacts based at least in part on monitoring transmission of the one or more data packets.

In some embodiments, a computing system is disclosed. The computing system may comprise a processor and a memory for storing instructions that, when executed by the processor, configure the computing system to perform the method disclosed above.

In some embodiments, a non-transitory computer-readable storage medium is disclosed. The non-transitory computer-readable storage medium may store/include instructions that, when executed by a computing system, cause the computing system to perform the method disclosed above.

BRIEF DESCRIPTION OF THE DRAWINGS

To easily identify the discussion of any particular element or act, the most significant digit or digits in a reference number refer to the figure number in which that element is first introduced.

FIG. 8 illustrates example call parameters for a sending request, according to at least one embodiment.

FIG. 10 illustrates a set of data fields for monitoring data transmission, in accordance with at least one embodiment.

FIG. 11 illustrates a set of data fields for monitoring data reception, in accordance with at least one embodiment.

DETAILED DESCRIPTION

Figure 1:
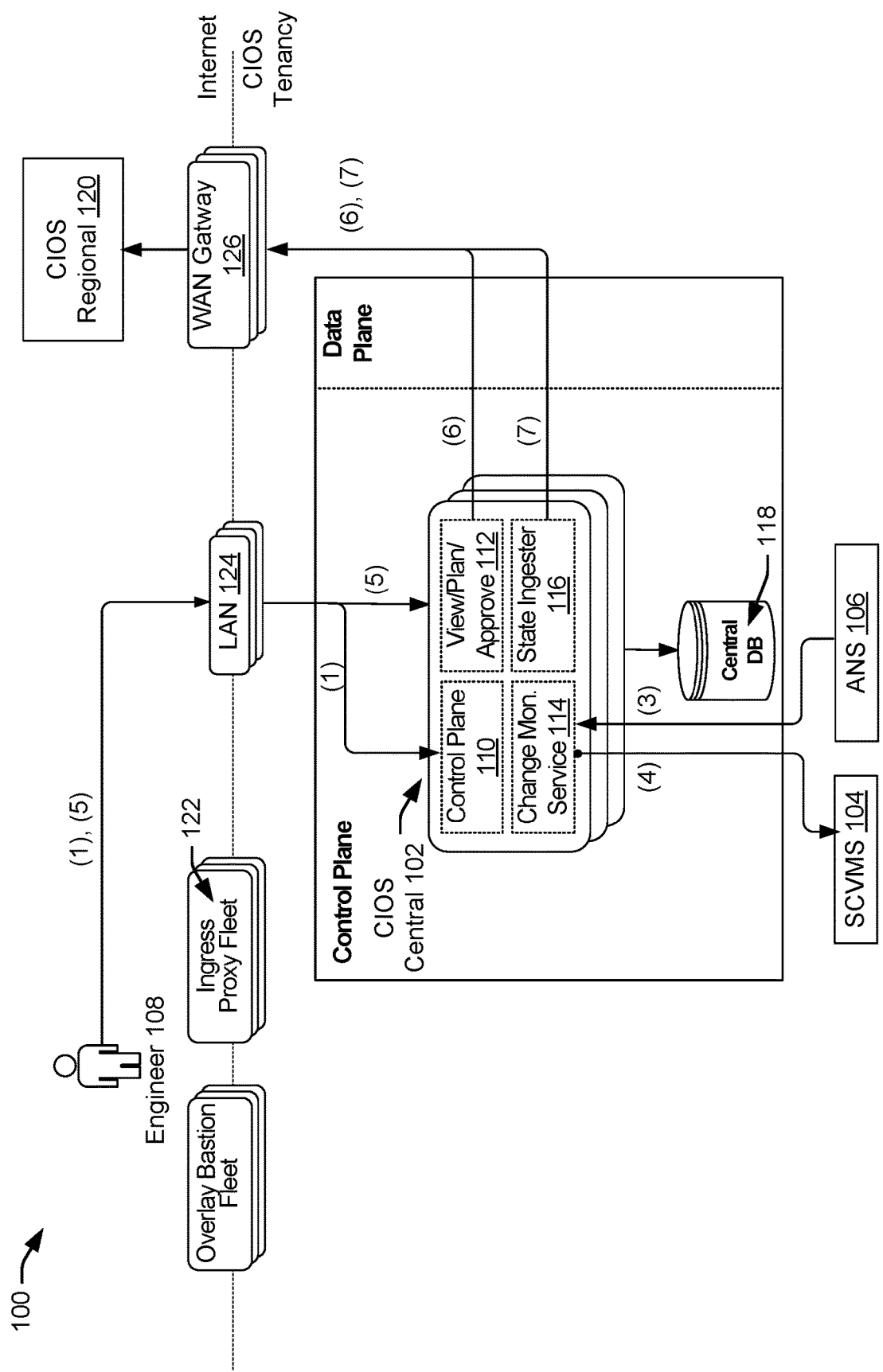
FIG. 1 is a block diagram of an architecture for implementing at least some elements of a cloud infrastructure orchestration service, according to at least one embodiment.

In some examples, infrastructure as a service (IaaS) is one particular type of cloud computing. IaaS can be configured to provide virtualized computing resources over a public network (e.g., the Internet). In some examples, IaaS is one of the three main categories (or sub-categories) of cloud computing services. Most consider the other main categories to be software as a service (SaaS) and platform as a service (PaaS), and sometimes SaaS may be considered a broader category, encompassing both PaaS and IaaS, with even some considering IaaS to be a sub-category of PaaS as well.

In an IaaS model, a cloud computing provider can host the infrastructure components (e.g., servers, storage devices, network nodes (e.g., hardware), deployment software, platform virtualization (e.g., a hypervisor layer), or the like).

In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) in each VM, deploy middleware, such as databases, create storage buckets for workloads and backups, and install even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., selling) IaaS. An entity might also opt to deploy a private cloud, becoming its own provider of infrastructure services.

In some examples, IaaS deployment is the process of putting a new application, or a new version, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some embodiments, IaaS provisioning may include generating a directed acyclic graph (DAG). A DAG may be a finite directed graph that includes any suitable number of nodes and edges, with each edge being directed from one node to another. The nodes and edges may be arranged to avoid directed cycles. That is, the DAG is arranged such that there is no way to start at any node and follow a consistently directed sequence of edges that eventually loop back to that same node. IaaS provisioning may include parsing configuration files corresponding to one or more resources (e.g., services, software resources, etc.) of the system. A separate DAG may be generated for each resource. The DAG for each resource may define dependencies of that resource on capabilities of one or more other resources. A "capability" may be intended to refer to a portion of functionality of a given resource. A process may be instantiated to traverse a DAG. When a node of the DAG is reached that corresponds to a capability that is currently unavailable, the process may publish to a scheduling service an indication that the process has reached a dependency on the capability and thus, is waiting for that particular capability to become available before it can proceed. As various resources of the system are deployed and/or booted up these resources may publish to a scheduling service an indication of the various capabilities availability as the capabilities become available. As used herein, the term "boot," "booting," "booted" refer to a process of performing a startup sequence of operations corresponding to a particular resource (e.g., a software service, a computing device, etc.). Deploying a resource (e.g., a software service) can include booting and/or otherwise making available at least some portion of functionality provided by the resource. When the scheduling service determines that the particular capability has become available, it may restart the process from the point at which it exited last (e.g., just after publishing the need for the capability). The process may regenerate the DAG and recommence traversal (e.g., from the last node accessed). By utilizing the DAGs for each resource, the system may manage capabilities between resources such that human operators are no longer need to manually boot a complex system up.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

As noted above, one way to provision the infrastructure is to describe it declaratively. As such, the configuration file may be a declarative file that merely describes each of the infrastructure components noted above and how they interact. The configuration file can describe the resource and the relevant fields needed to create the element, and then as other elements can be described that reference the previously described elements. In some examples, a provisioning tool can then generate a workflow for creating and managing the elements that are described in the configuration file.

In some instances, the workflow of the provisioning tool may be configured to perform various commands. One function that can be performed is view reconciliation, where the provisioning tool can compare the view of the current infrastructure (e.g., the expected state of the infrastructure) with how the infrastructure is actually running. In some instances, performing the view reconciliation function may include querying various resource providers or infrastructure resources to identify what resources are actually running. Another function that the provisioning tool can perform is plan generation, where the provisioning tool can compare the actually running infrastructure components with what the provisioning tool wants the state to look like (e.g., the desired configuration). In other words, the plan generation function can determine what changes need to be made to bring the resources up to the most current expectations. In some instances, a third function is the execution (e.g., apply) function, where the provisioning tool can execute the plan generated by the plan generation function.

In general, provisioning tools may be configured take the configuration file, parse the declarative information included therein, and programmatically/automatically determine the order in which the resources need to be provisioned in order to execute the plan. For example, if the VPC needs to be booted before the security group rules and VMs are booted, then the provisioning tool will be able to make that determination and implement the booting in that order without user intervention and/or without that information necessarily being included in the configuration file.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

As noted above, generally there are two different tools used to handle each of the provisioning of infrastructure resources and the deployments of code to control the infrastructure resources, with orchestration between the two tools being performed manually. However, at scale, manual implementation always leads to deviations. Thus, an automated tool that can both provision and deploy a virtual infrastructure enables more efficient and reliable techniques for implementing a virtual cloud environment.

In some examples, when two tools are used, issues can arise when a user manually makes changes to the code between the provisioning phase and the deployment phase. As described herein, a technique that uses a single tool for both provisioning and deploying can alleviate that by automating the process, such that there isn't an opportunity for manual code changes. It may be the case, that a slight change to the way in which one user codes something, can create major issues in the deployment phase. In some examples, the first time an operator performs an action in a new region (e.g., a typo in the code), the object that was coded with the typo may be that way forever. If the application is deployed with that typo, and the application is not sensitive to that typo (e.g., it still works), it is possible that some time down the road, an additional code change could become sensitive to that typo, and crash the entire system. Thus, the techniques provided herein can remove the gap between provisioning and deployment that can often lead to problems.

In general, modeling deployments is declarative such that a configuration file can be used to declare the infrastructure resources. For example, create, read, update, delete (CRUD) instructions are generally used to generate deployment files using general Representational State Transfer (REST) concepts (e.g., REST Application Programming Interfaces (APIs)). However, deployment itself doesn't generally follow the same concept. Additionally, while the infrastructure provisioning tools tend to be really powerful and/or expressive, the tools for deployment tend to be much more restrictive regarding the operations they can perform (e.g., they are imperative as opposed to declarative). Thus, there has been a long-felt need for a tool that can handle both functional requirements (e.g., provisioning and deployment of infrastructure elements) within a cloud environment.

In some examples, techniques for implementing a cloud infrastructure orchestration service (CIOS) are described herein. Such techniques, as described briefly above, can be configured to manage both provisioning and deploying of infrastructure assets within a cloud environment. In some instances, the CIOS can include two classes of service: the Central and Regional components (e.g., CIOS Central and CIOS Regional). The following terms will be used throughout:

Infrastructure component—A long-lived piece of infrastructure that supports running code.
   Examples: a deployment application, a load balancer, a domain name system (DNS) entry, an object storage bucket, etc.

Artifact—Code being deployed to a deployment application or a Kubernetes engine cluster, or configuration information (hereinafter, "config") being applied to an infrastructure component. These may be read-only resources.

Deployment task—A short-lived task that is often associated with deploying or testing code. Additionally, the deployments tasks are modeled as resources that live no longer than the release that creates them.
   Examples: "deploy $artifact to $environment," "watch $alarm for 10 minutes," "execute $testSuite," or "wait for $manualApproval"
   For example, CIOS can model a deployment orchestrator deployment as the creation of a resource that transitions to the Available state when it completes.
   Because CIOS maintains the state of its cloud infrastructure service declarative provisioner, CIOS can control the lifecycle of these short-lived resources as it relates to releases.

Resource—a CRUD'able resource.
   CIOS models each of the constructs listed above as a resource. The next section discusses this modeling in detail.

Flock—CIOS's model encapsulating a control area and all its components. Exists primarily to model ownership of and point at the infrastructure components.

Flock config—Describes the set of all infrastructure components, artifacts, and deployment tasks associated with a single service.
   Each Flock has exactly one Flock config. Flock configs are checked in to source control.
   Flock configs are declarative. They expect CIOS to provide realm, region, ad, and artifact versions as input.
   Flocks are granular—a Flock consists of a single service and supporting infrastructure.

State—A point-in-time snapshot of the state of every resource in the flock.

Release—A tuple of a specific version of a flock config and a specific version of every artifact that it references.

Think of a release as describing a state that may not yet exist.

Release plan—The set of steps that the CIOS would take to transition all regions from their current state to the state described by a release.

Release plans have a finite number of steps and a well-defined start and end time.

Apply—This is a noun. A single attempt to execute a Release plan. An Execution changes the current State of the Flock.

CIOS can be described as an orchestration layer that applies configuration to downstream systems (e.g., worldwide). It is designed to allow world-wide infrastructure provisioning and code deployment with no manual effort from service teams (e.g., beyond an initial approval in some instances). The high level responsibilities of CIOS include, but are not limited to:

Providing teams with a view in to the current state of resources managed by CIOS, including any in-flight change activity.

Helping teams plan and release new changes.

Coordinating activity across various downstream systems within a region to execute approved release plans with no human intervention.

Coordinating activity across regions/realms to execute approved release plans world-wide.

In some examples, CIOS handles onboarding by enabling teams to provide CIOS with configuration information via checked-in code. Additionally, CIOS can automate more things, so this is a heavier-weight exercise than in previous implementations. In some instances, CIOS handles pre-deployment by offering teams the ability to automatically deploy and test code. In some instances, CIOS can handle the writing of change management (CM) policy by enabling automatically generating plans to roll out new artifacts (e.g., world-wide) when a team builds them. It can do this by inspecting the current state of each region and the current CIOS config (which, can itself be an artifact). Additionally, teams can inspect these plans, and may iterate on them by changing the CIOS config and asking CIOS to re-plan. Once the team is satisfied with a plan, they can create a "release" that references the plan. The plan can then be marked as approved or rejected. While teams can still write CMs, they are just pointers to the CIOS plan. Thus, teams can spend less time reasoning about the plan. Plans are more accurate because they are machine generated. Plans are almost too detailed for human consumption; however, it can be displayed via a sophisticated user interface (UI).

In some examples, CIOS can handle execution of CMs by automatically executing the deployment plan. Once release plan has been created and approved, engineers no longer participate in CMs unless CIOS initiates roll-back. In some cases, this may require teams to automate tasks that are currently manual. In some examples, CIOS can handle rolling back a change management (CM) by automatically generating a plan that returns the flock to its original (e.g., pre-release) state when CIOS detects service health degradation while executing. In some examples, CIOS can handle deploying emergent/tactical changes by receiving a release plan that is scoped to a subset of regions and/or a subset of the resources managed by CIOS, and then executing the plan.

Additionally, CIOS may support primitives necessary to define fully automated world-wide deployments. For example, CIOS can measure service health by monitoring alarms and executing integration tests. CIOS can help teams quickly define roll-back behavior in the event of service degradation, then can execute it automatically. CIOS can automatically generate and display release plans and can track approval. In some instances, the language that teams use to describe desired deployment behavior may be declarative. CIOS can combine the functionality of code deployment and infrastructure config (e.g., provisioning) in one system. CIOS also supports flexible ordering across regions, and across components within a region. Teams can express ordering via checked-in config. Teams may call CIOS's planning and release APIs programmatically.

FIG. 1 depicts an architecture 100 for illustrating techniques for implementing at least CIOS Central 102. In some examples, CIOS Central 102 can be the service that handles operations at the level of a "Flock." CIOS Central 102 has a few responsibilities, including but not limited to:

Serving as an authentication gateway for Flock metadata changes and release operations.

Storing an authoritative mapping of Flock metadata to the deployment artifacts and CIOS repositories for the flock.

Coordinating global Releases across Phases and Targets.

Synchronization to enforce policies like "no more than one ongoing release to a Flock at a time."

Detecting changes to Flock configuration (config) and artifacts, and triggering a release generation on such changes.

In some examples, a source code version-control management service (SCVMS) 104 can be configured to store authoritative Flock configuration and an artifact notification service (ANS) 106 can be subscribed to by CIOS Central 102, so that CIOS Central 102 can be informed of new artifact builds. The CIOS Central 102 can then map incoming changes against the affected flocks, and initiate release planning where desired. Additionally, in some examples, an artifact push service (APS) can be invoked by CIOS Central 102, before a release to a target, to ensure any artifacts required for a successful release are present in the target's region ahead of release.

In some examples, customers (e.g., engineers) 108 can call CIOS Central 102 to CRUD flocks and/or releases, and to view the status of ongoing CIOS activity. Flock management service 110 can include one or more API's to manipulate flocks, view/plan/approve service 112 can include CRUD API's to create and approve plans, and to view a central copy of the state of all CIOS-managed resources, change monitoring service 114 can watch SCVMS 104 for changes to flock config, and can receive notifications about changes to other artifacts from ANS 106, and state ingester service 116 can create copies of regional state in CIOS Central database (DB) 118 so that view/plan/approve 112 can expose them. In some examples, the CIOS Central DB 118 can be a DB of flocks, plans, and state. Flock information can be authoritative; while everything else may be a stale copy of data from CIOS Regional 120. CIOS Central 102 may be configured to provide any suitable portion and/or number of user interfaces (e.g., user interfaces 500-1300) for presenting any suitable data related to a flock, a release, an infrastructure component, an artifact, or the like. In some embodiments, CIOS Central 102 may present via any suitable interface data related to one or more releases. A release may include any suitable combination of tasks related to one or more infrastructure components and/or one or more code changes to one or more applications (e.g., artifacts).

In some examples, engineer 108 can perform an API call for the flock management service 110 (e.g., through the ingress proxy fleet 122) to create a list of flocks. The protocol for making such an API call can be hypertext transport protocol secure (HTTPS) or the like. Relevant access control lists (ACLs) for this operation can include a local area network (LAN) 124 or other private connection. For example, CIOS may manage/control a network-connectivity alternative to using the public Internet for connecting a customer's on-premises data center or network with CIOS (e.g., a dedicated, leased, and/or private connection). Additionally, authentication and authorization (e.g., of the engineer 108) may be performed by a reservation system portal that allows users to manage machine infrastructure (e.g., reservation service). In some instances, CIOS Central 102 can store flock metadata, plans, and state in the Central DB 118, using Java database connectivity (JDBC) or the like. In some examples, ANS 106 can be configured to notify the change monitoring service 114 when new artifacts have been published. The ANS 106 may use HTTPS, and both authentication and authorization may be handled by a mutual transport layer security service. Additionally, in some instances, the change monitoring service 114 can poll the SCVMS 104 for flock configuration changes. This polling can be performed using secure shell (SSH) or other protocols. Authentication of the change monitoring service 114 may be handled by a CIOS system account and authorization may be handled by SCVMS 104.

In some examples, the engineer 108 can use the view/plan/approve service 112 to do one or more of the following operations. The engineer 108 can plan and/or approve by calling CIOS Central 102 to generate and approve plans. The engineer 108 can view by calling CIOS Central 102 to view the status of ongoing CIOS activity world-wide. Additionally, the engineer 108 can CIOS Central 102 to view a replica of the state of CIOS-managed resources world-wide. These API calls (or the like) can be performed via the HTTPS protocol or similar protocols. Additionally, relevant ACLs can be controlled by LAN 124, and both authentication and authorization can be handled by the reservation service. In some examples, the view/plan/approve service 112 can request planning and push plan approval to all regions of CIOS Regional 120 (e.g., using HTTPS or the like). Relevant ACLs can be controlled using a security list managed by the wide area network (WAN) gateway 126. Authentication can be handled by mutual transport layer security and authorization can be handled by various identity policies. Further, the state ingester service 116 can watch CIOS Regional 120 for job status or state changes, so that CIOS can provide a central view of them upon request (e.g., also using HTTPS or the like). ACLSs for this can also be handled by the WAN gateway 126, and both authentication and authorization can be handled by mutual transport layer security services.

Figure 2:
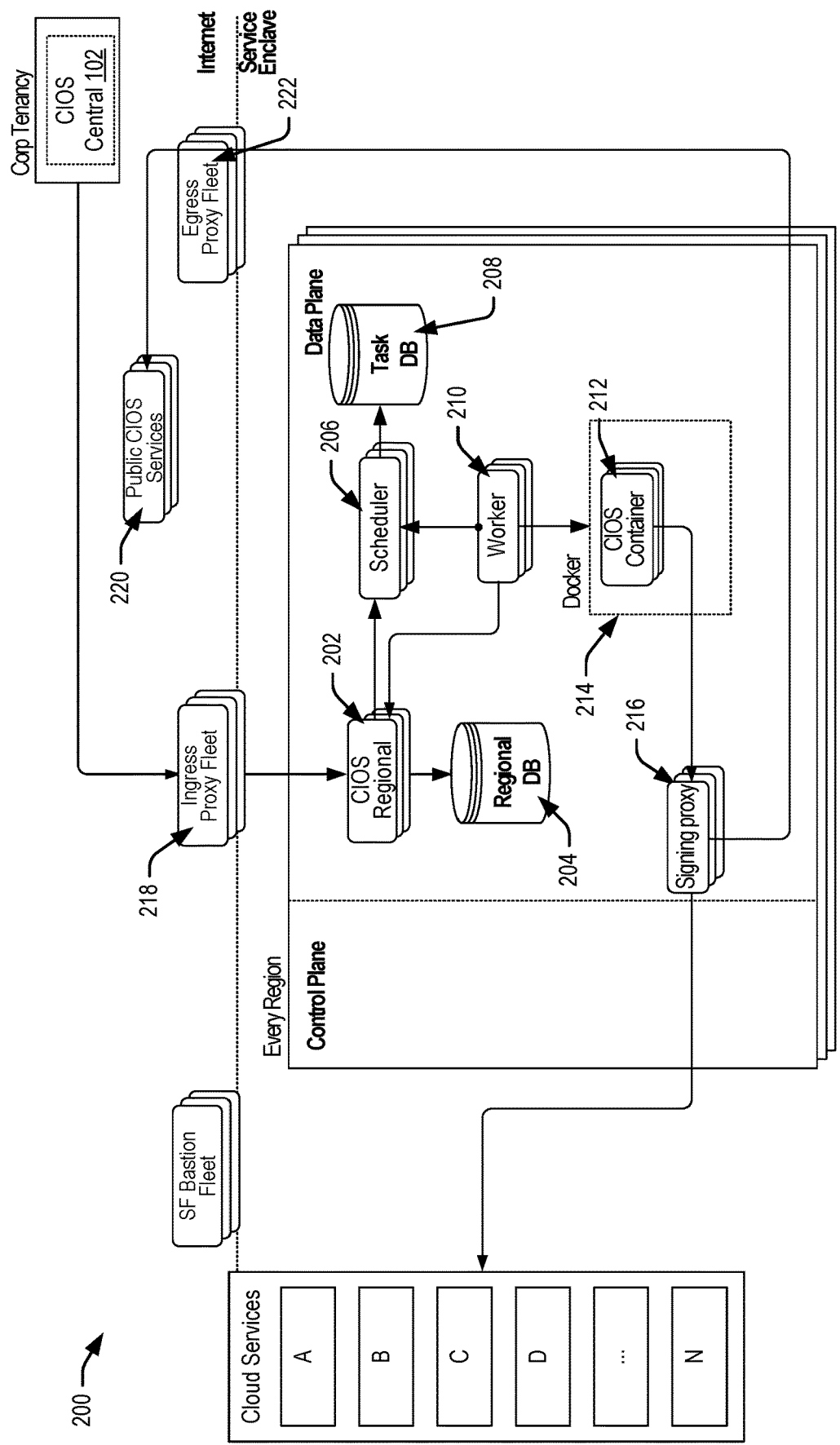
FIG. 2 is a block diagram of an architecture for implementing at least some elements of a cloud infrastructure orchestration service, according to at least one embodiment.

FIG. 2 depicts an architecture 200 for illustrating techniques for implementing at least CIOS Regional 202. In some examples, CIOS Regional 202 is where much of the work of declarative provisioning and planning, as well as approved release application can occur. In some instances, each instance of CIOS Regional 202 may have a regional fronted that can handle operations at the level of "Execution Targets." It can be configured to perform the following:

Handling all CIOS Authentication for incoming operations from CIOS Central 102.
Enforcing a rule that only one "execution" (plan/import resources/apply plan) can be ongoing for a given Execution target at a time.
Managing binary artifact storage for declarative provisioning artifacts used for input and output during declarative infrastructure provisioning execution. Examples of input are declarative infrastructure provisioning configuration files and an input state file. Typical output is a final state file.
Requesting work from and polls for results from the CIOS Executor for any given execution.

In some instances, the CIOS Frontend may be dependent on a CIOS Executor 206 (also referred to herein as a "scheduler"), which can handle the actual execution. The CIOS Executor, in some examples, operates at the level of "Execution," and it can:

Track a pool of available Worker nodes
Query incoming job requests, and assigns them to eligible workers as available
Track worker status and Execution updates for reporting to clients
Detect dead nodes via a leasing protocol, and can fail tasks assigned to dead nodes, depending on task status.
Provide facilities to cancel/kill/pause/resume Executions, and can map those onto facilities to pass cancellation/kill/resumption info on to Worker nodes.

In some instances, the CIOS Executor can depend on CIOS Workers, which can assign tasks for execution to Workers, and provide a facility for Workers to update job progress. The worker service operates at the granularity of "Task." Each worker is an agent executing Tasks assigned to that worker and reporting Task status and output. Each worker can:

Poll Executor Worker APIs for assigned work items, and take action to make the assign state match its local state:
start containers for polls task items that do not exist locally
kill containers for locally running containers that have no corresponding assigned task item
Report status for jobs
Stage input and output for job container execution
Launch and monitor declarative infrastructure provisioning containers for doing the real work of a Release for an Execution Target.

CIOS Workers may depend on CIOS Executor to poll work from and report results to the worker endpoint of the CIOS Executor. The Worker may rely on the Executor for all coordination. Additionally, the CIOS Workers may also depend on CIOS Regional 202, where the Worker services reads input from and writes output to one or more APIs that are associated with the Regional Frontend service. Examples of input are configuration and starting state files and import mappings. Examples of output are declarative provisioning process, output declarative provisioning state files, and import result states.

In some examples, CIOS Regional 202 can be a regional service for managing regional instances/deployments of CIOS. CIOS Regional 202 covers responsibility for authoritatively storing and managing plans and stat that pertains to a particular region. A Regional DB 204 may be a CIOS DB for the state and plans in the particular region. This is the authoritative copy of the region's subset of the Central DB 118 of FIG. 1. Scheduler 206 can be responsible for managing worker fleet capacity, assigning tasks to workers, and keeping track of task state. In some instances, Task DB 208 is another CIOS DB for task state. Data in this DB is mostly for operational purposes. Additionally, Worker 210 can be a fleet of java virtual machines (JVMs) that manage declarative provisioning images. These receive instructions from the Scheduler 206 and communicate results to both the Scheduler 206 and CIOS Regional 202. A CIOS container 212 can run declarative provisioning actions in its own private docker 214 container. This container does not need to contain secrets. Additionally, in some examples, a signing proxy 216 can be configured to prevent secret exfiltration via a declarative provisioning tool, in order to avoid putting secrets in the declarative provisioning Image. Instead, CIOS can perform request signing or initiate a mutual transport layer security (mTLS) service in a proxy. This also makes it easier to use FIPS-compliant crypto libraries.

In some examples, CIOS Central 102 can call CIOS Regional 202 to create plans, push approvals, watch job status (service principal), and extract declarative provisioner state (service principal). An ingress proxy 218 can be configured as the ACL and various identity policies may be used for both authentication and authorization. Alternatively, in some examples, the ingress proxy 218 may be replaced with a load balancer configured to balance the load incoming requests, plans, etc. In some instances, CIOS Regional 202 may run a declarative provisioner by asking the scheduler 206 to do so. Worker 210 can ask Scheduler 206 what it should be running, and can report status to Scheduler 206 when done. In some cases, mTLS may handle both authentication and authorization for CIOS Regional 202 and Worker 210. Additionally, when Worker 210 needs to run a declarative provisioner, it does so in docker containers by interacting with the local docker 214. Authentication for this stage may be handled by a local unix socket. A docker protocol may be used for this last step; however, HTTPS may be utilized for the previous ones.

In some embodiments, CIOS Regional 202 may be configured to provide any suitable portion and/or number of user interfaces (e.g., user interfaces 500-1300) for presenting any suitable data related to a flock, a release, an infrastructure component, an artifact, or the like. In some embodiments, CIOS Regional 202 may present via any suitable interface data related to one or more releases. A release may include any suitable combination of tasks related to one or more infrastructure components and/or one or more code changes to one or more applications (e.g., artifacts).

In some examples, the CIOS container 212 enables a declarative provisioner to interact (via API) with the signing proxy 216, while the declarative provisioner thinks it's calling various CIOS services. The signing proxy 216 listens on one ephemeral port per calling instance of declarative provisioner, known only to that declarative provisioner. The signing proxy 216 can initiate requests signatures or mTLS, and can pass the declarative provisioner's calls through to other CIOS services within the service enclave. In some instances, the signing proxy 216 can also communicate with one or more public CIOS services 220. For example, the Signing Proxy 216 will use the internal endpoint of public services where possible. For services with no internal endpoint, it must use the egress proxy 222 to reach the external endpoint. This use of the signing proxy 216 may not be for cross-region communication; for example, an egress proxy whitelist in each region may only be for that region's public IP ranges. In some examples, Worker 210 may then persist state and logs from a declarative provisioner in CIOS Regional 202 so that they can be exfiltrated to CIOS Central 102.

Using CIOS, there are a few phases of a representative customer experience: onboarding, pre-release, world-wide release, and tactical release. For the pre-release phase, the below is an example of what happens between a new artifact being built and releasing artifacts to release one (e.g., R1). This should replace some or most of current change management processes. As relevant artifacts are built, CIOS can automatically generate releases using "the latest version of everything in the flock." A release is a specific version of the flock config with specific inputs (e.g. artifact versions, realm, region, and ad). A release contains one roll-forward plan per region and metadata describing region ordering. Each regional plan is the set of operations a declarative provisioner would take to realize the flock configuration in that region. Teams with pre-release environments can use CIOS to automatically release and test software in said environments. Teams can configure CIOS to automatically test the roll-back plan. Teams will be able to inspect and approve releases through the CIOS UI. Teams can approve some but not all of the regional plans within a release. If "the latest version of everything" yielded no suitable plans, teams can ask CIOS to generate a plan for cherry-picked artifact versions.

For the world-wide release phase, the below is an example of how a team executes tomorrow's version of today's "normal CM." Once a release is approved, CIOS pushes each approved regional plan to the respective region. CIOS acts independently within each region to apply approved plans. CIOS will only perform the set of actions explicitly described in that region's plan. Instead of "thinking independently," it will fail. CIOS UI shows teams the progress of the execution. CIOS UI prompts teams when manual approvals are required. If execution fails because of an outage in CIOS or in a downstream service, CIOS can notify the team and can prompt them for next steps (e.g., abort, retry). CIOS does perform retries, but some downstream system outages will exceed its willingness to retry. If execution fails because of service health degradation or a test failure, CIOS will assist teams with rolling the flock back to its starting state. CIOS will notify (e.g., page) teams when it initiates automatic rollback. Teams must approve the roll-back plan, then CIOS will execute it.

For the tactical release phase, the below is an example of how a team can execute tomorrow's version of an "emergent CM." When generating a plan, teams may ask CIOS to target the plan at specific resources in several ways: topologically (e.g., realm, region, AD, etc.), by resource type (e.g., "only metrics configs" or "only deployment orchestration service deployments", etc.), or combinations of the above (e.g., in a disjunctive manner). Teams approve tactical releases just like world-wide releases. CIOS orchestrates them similarly. If a team needs to deploy a tactical release while there is an active a world-wide release, CIOS will stop executing the world-wide release in the targeted regions, then start executing the tactical release.

In some examples, a declarative provisioner's state (e.g., traditionally a file) is an authoritative record of the set of resources managed by the declarative provisioner. It contains the mapping between the logical identifier of each resource from the configuration file and the actual identifier of the resource. When the declarative provisioner is creating a resource, certain kinds of failure can prevent the actual identifier from being recorded in the state. When this happens, the actual identifier is lost to the declarative provisioner. These can be called "orphaned resources."

For most resources, orphans represent waste—the declarative provisioner launched (for example) an instance that it forgot about, but will launch another instance instead the next time it is run. For resources with uniqueness constraints or client-supplied identifiers, orphans prevent the declarative provisioner from making forward progress. For example, if the declarative provisioner creates a user 'nglass' and a failure orphans it, the next run of the declarative provisioner will attempt to create 'nglass' and fail because a user with that username already exists. In some cases, orphans are only a problem when adding new resources to the state. In some instances, the declarative provisioner's refresh behavior may naturally recover from failures to record updates and deletions.

CIOS needs to be robust in the event of downstream service outages or outages of CIOS itself. Because CIOS can leverage a declarative provisioner to apply changes, this means there should be robustness around running the declarative provisioner and maintaining the declarative provisioner state. The declarative provisioner providers perform 'small scale' retries-enough to avoid outages lasting for small numbers of minutes. For example, a cloud provider will retry for up to 30 minutes. Downstream system outages lasting longer than 30 minutes will cause the declarative provisioner to fail. When the declarative provisioner fails, it records all changes it successfully made in the state, then exits. To retry, CIOS must re-execute the declarative provisioner. Re-executing the declarative provisioner also allows CIOS to retry in the event of a failure in CIOS itself. In some instances, CIOS can run the following operations in a loop:

Refresh—the declarative provisioner calls GET APIs to retrieve a fresh snapshot of every resource described in its state.

Plan—the declarative provisioner generates a plan (a concrete set of API calls) that will realize the desired state, given the recently-refreshed current state.

Apply—the declarative provisioner executes the set of steps in the plan.

CIOS may always run all three of these steps when executing the declarative provisioner. The refresh operation helps recover from any updates or deletions that weren't recorded. CIOS inspects the result of the plan operation and compares it to the approved release plan. If the newly generated plan contains operations that were not in the approved release plan, CIOS may fail and may notify the service team.

Figure 3:
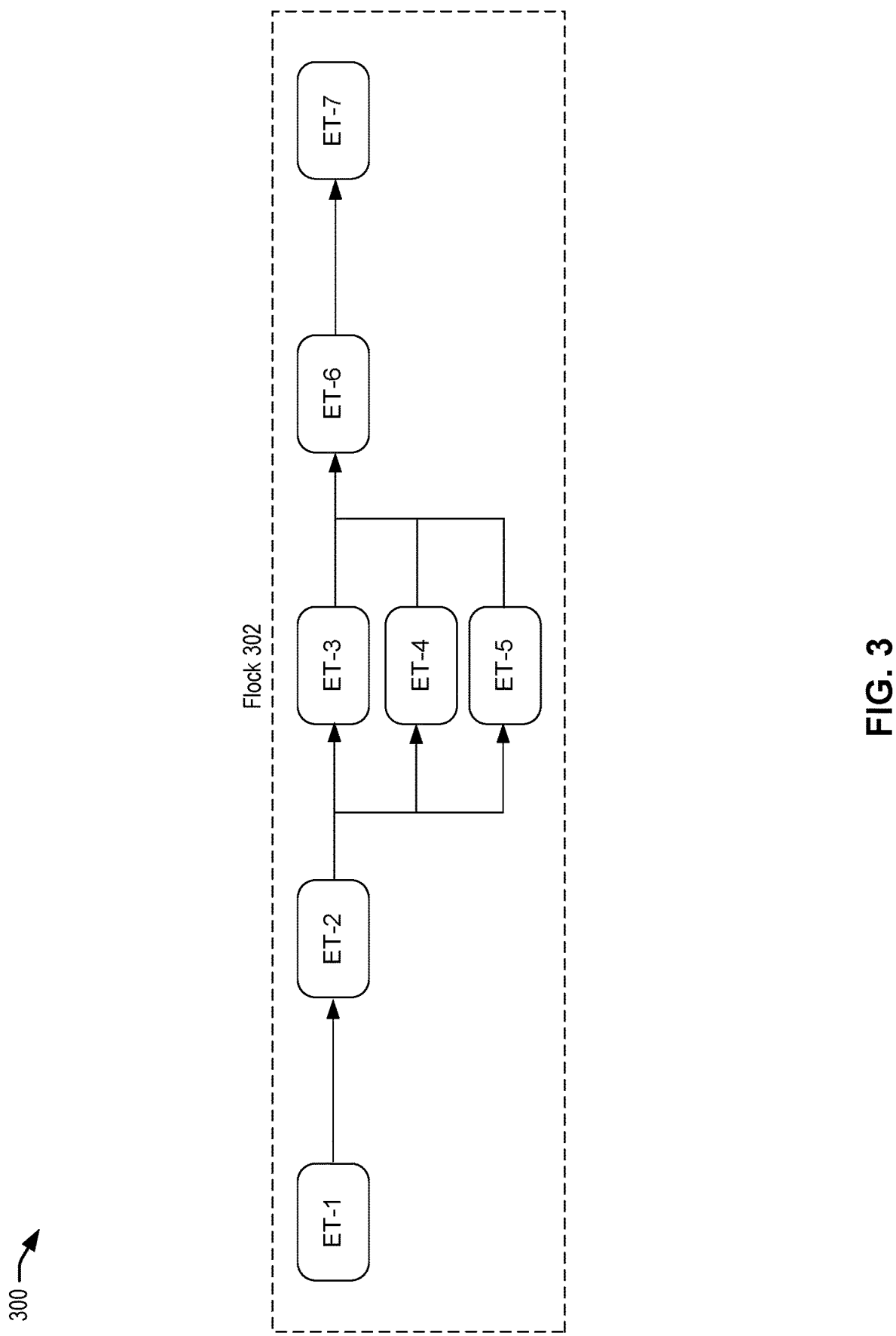
FIG. 3 is a flow diagram for illustrating an example flock, according to at least one embodiment.

FIG. 3 depicts a directed acyclic graph (DAG) 300 for illustrating an example flock 302. The progression of code/config from check-in to production, for a single flock config in CIOS, can be described all the way from the first testing deployment to the last prod deployment. Internally, CIOS calls each element in the progression an Execution Target (ET)—this is all over our internal APIs, but does not leak out in to the flock config. CIOS executes ETs based on the DAG 200 defined in the flock config. Each ET (e.g., ET-1, ET-2, ET-3, ET-4, ET-5, ET-6, and ET-7) is, roughly, one copy of the service described by the flock config.

Figure 4:
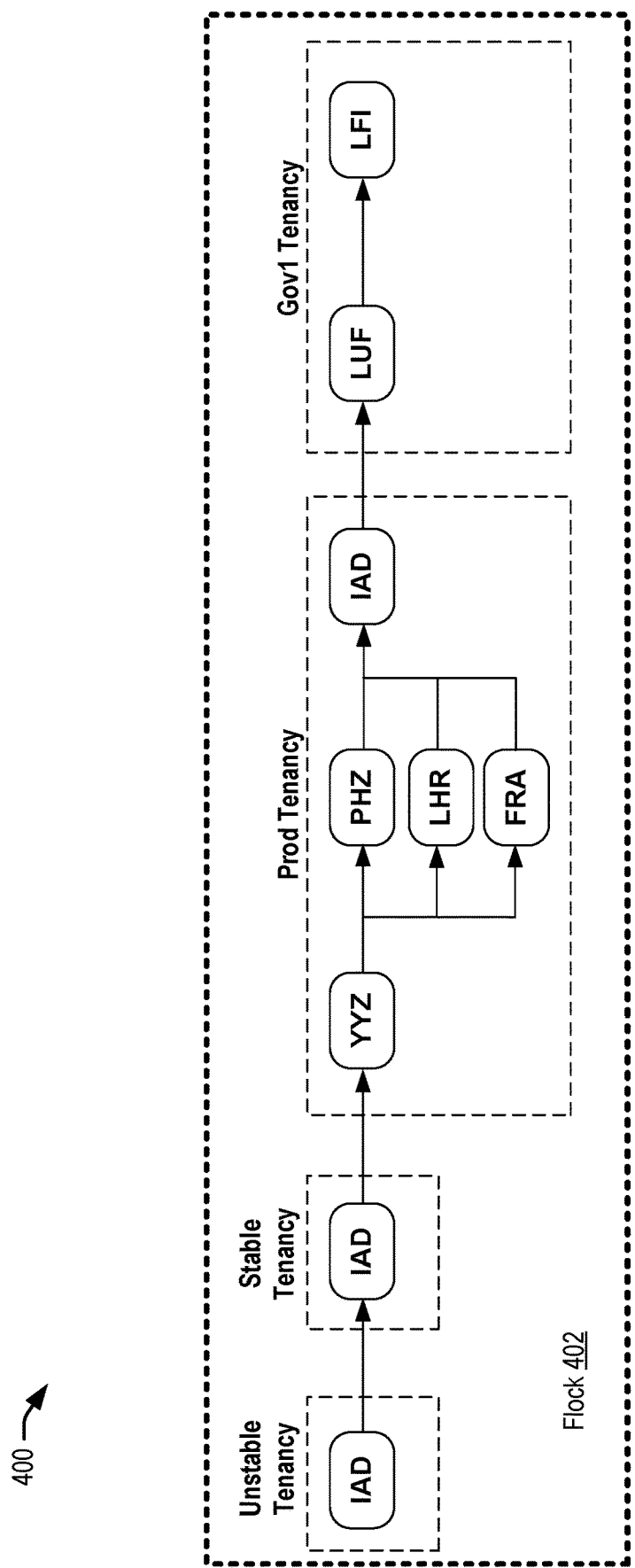
FIG. 4 is a flow diagram for illustrating an example flock, according to at least one embodiment.

FIG. 4 depicts a DAG 400 for illustrating and example flock 402. In the flock config, CIOS is very opinionated about how teams express this progression-they must model it using cloud infrastructure tenancies and regions. Teams should not model progression using realms. CIOS allows teams to use many tenancies within a realm and many regions within a tenancy. However, CIOS does not allow teams to use the same region twice within a tenancy (though they may use the same region twice within a realm—in different tenancies). DAG 400 illustrates a version of DAG 300 from FIG. 3, expressed with tenancies and regions. This example is for an overlay service, where pre-prod ETs are in a prod region. A service enclave service would have the unstable and stable tenancies in release one. In DAG 400, IAD is a regional airport code for Dulles airport in Washington, D.C., YYZ is a regional airport code for Toronto, Ontario, PHX, LHR, and FRA, are regional airport codes for Phoenix, London, and Frankfurt, respectively, and LUF and LFI are for two different air force bases.

In one embodiment, CIOS and/or other techniques described herein are an improvement on each of Terraform (a declarative provisioning tool), Tanden (a code generation tool), and the Oracle Deployment Orchestrator (ODO). Additionally, in some examples, CIOS and/or other techniques described herein can be implemented using at least portions of the Terraform, Tanden, and ODO tools.

For highly secure use cases, a dedicated data center may be built. In some embodiments, there may be restrictions on data transfer to use a special purpose one-way data transfer devices also known as a 'data diode'. A data diode (also referred to as a "data diode endpoint device") may be configured such that there is no end-to-end acknowledgement of data reception at the receiver. A sender component (e.g., a data diode, referred to as a "low-side data diode") and a receiver component (e.g., a data diode, referred to as a "high-side data diode") may be connected via an optical cable that physically allows transfer in only one direction (e.g., from the low-side data diode/sending device to the high-side data diode/receiving device). Because no data can be transmitted via the optical cable in the opposite direction, these devices may be referred to as creating an air gap between source and destination. The phrase "air-gapped" may be utilized interchangeably with "disconnected." This data transfer restriction can impact normal business operations such as deploying changes. A "low side" (e.g., including the low-side data diode/sending device) may be an unsecured, connected (e.g., to a public network such as the Internet) environment, while the "high side" (e.g., including the high-side data diode/receiving device) may be a secure computing region that is secure and disconnected (e.g., not connected to any public networks such as the Internet).

In some embodiments, a client-facing service in front of a data diode device may be provided. The client-facing service may include the following properties:

It is user-friendly for an intended set of clients (currently: the APS worker service).

It supports some form of cross-domain authorization for artifact writing, so that write restrictions for artifact destinations can be enforced between the unsecured environment and the secure region (e.g., at least at the granularity of tenancy).

The entire service is testable end to end mostly or entirely on a developer desktop or laptop, in a fully disconnected fashion.

The service is built in a way that enables building without knowledge of exactly what interfaces are provided to and from the data diodes.

In some embodiments, there may be two main classes of clients communicating with an Air Gap Service (AGS) on the sending side: production clients and testing clients. Testing clients may be utilized for low level end to end testing. Integration tests may communicate directly to AGS to push test artifacts.

In some embodiments, for certain artifact types, extra actions besides just the "last-mile" push of an artifact to its final destination will need to be taken for the artifact in question. Some of these actions may include:

Registry Service Push (Signatures): For pushes to a registry service, a signature may be associated with the artifact. This signature may be pushed to an Attestation Service (AS). AS may be used by a registry service to check artifacts before an image pull request.

Registry Service Push (Other): may be used by AS to push other attestation information into a region.

SLAPS Check Info: May be a service that coordinates scans on built artifacts and publishes this information to a service called ART (not depicted). The published information can also be considered attestations. ART will be consulted by APS before a push to gate artifact push into a secure region.

In some embodiments, some metadata may be associated with artifacts and may be modified as needed.

In some embodiments, a region sponsor of the secure region may require the following restrictions on data pushed into the region: 1) that it belongs to one of a restricted set of file types, 2) that one or more conditions are satisfied (e.g., that the content is scanned in one or more ways) before transmission/ingress, and whether the data transmission is contingent on success of the condition(s). In either case, the operations performed (e.g., one or more scans of the data) should not require any changes in APIs for AGS.

AGS may be configured to understand a number of artifact types and formats. Pushing (e.g., transmitting) an artifact into a secure region in general may include a number of steps, including, but not limited to:

Ingesting an Artifact: An AGS sending worker may be provided an artifact URL and type and may perform a pull accordingly. Additionally, or alternatively, the AGS may support a push mechanism. Each artifact time ingested by an AGS worker (e.g., a receiving AGS computing process instance) can have a number of destinations.

In some embodiments, images may be provided in a variety of formats.

Docker V1 images

Registry: Docker V1 images are pulled directly, manifest, then layer binaries, and pushed to a registry (e.g., a docker registry) in a region. No signature information is pushed.

Object Storage: Docker V1 images are pulled from an artifact repository (e.g., a storage location suitable for storing artifacts) in flattened form (the output of 'docker save'), along with a signature file in JWT format. Both files may be pushed to an object storage bucket in the region. The bucket may be owned by an orchestrator (e.g., CIOS Central 102), and named with the tenancy owning the compartment of the application for which the artifact is destined. The signature may be treated as a separate artifact, or both content and signature may be embedded inside a single content blob.

POP Store: In some regions, the orchestrator (e.g., CIOS Central 102) may not include a registry, and pushing may be avoided to avoid a circular runtime dependency. Instead, images may be pushed to the plain old process (POP) store in region, in the same format and with the same signatures as those used for object storage pushes. The POP store may be responsible for storing non-docker applications with live in the service enclave in a region.

Registry Service: The image is pushed, manifest first, then layer by layer to a registry service in the destination region. After this, APS may generate a signature for the image manifest. The manifest may contain SHA256 sums of image layers, and it may be sufficient to verify provenance of all the image bytes. In some embodiments, an artifact repository or a build system may manage over signature generation. The signature may be pushed to an Attestation service. AS may be utilized by registry service to gate artifact pulling requests from end hosts.

APS Staging release. In some embodiments, the APS ecosystem may be replicated into each secure region, artifacts may be pushed to a regional artifact repository (or a store that replaces it) and APS may take over from there.

Ingest Release: In some embodiments, there may be no other ingress into the region at launch, AGS can act as a "service gateway" for certain other types of release-related information. This release info may be represented as an artifact type for a restricted set of release types and handled them accordingly. For "release artifacts" the end destination may not be a push to a region, but rather a call into the secure region's local copy of CIOS Central to trigger a release workflow.

In some embodiments, a data diode may include hardware such as two COTS rackmount servers. These servers may be outfitted with special hardware, (e.g., a sending card on one machine, and a receive card on the other, connected by an optical transit-only cable). A physical layer used for the air gap transfer may be a modified version of Asynchronous Transfer Mode, or ATM, and may allow larger packet sizes than the standard 53 bytes (5 bytes header+48 bytes data. In some embodiments, the following software may be utilized:

TPTS: allows proxying of a TCP stream into through the data diode.

SNTS: This is like TPTS, but allows multiplexed streams over the channel.

DFTS: provides functionality to replicate files and directories across the air gap. In DFTS, the data may be required to be staged on the sending side server itself rather than an external client. On the receive side it may be fetched from the receiving server directly. In some embodiments, DFTS can run on top of SNTS to replicate files across the air gap.

OSMS: Like DFTS, except OSMS can be configured to provide the ability to scan files ahead of sending.

In some embodiments, and AGS sender is a component bracketing the data diode on the low security or "blue" side of the airgap. Its responsibilities are to, among other things:

abstract downstream services from the diode authenticate requests going in to the diode encode outbound data. This includes:
  artifact content
  artifact type
  artifact destination (optional), or as much as is available
  other metadata, as described above Forward message to the diode.

In some embodiments, the sender can also send extra messages to the downstream side via an air gap protocol. This may allow a AGS receiver to make determinations about the health of the system end to end.

In some embodiments, an AGS sender may internally house two components:

a set of workers implementing the AGS data path an API service to create and update AGS request metadata In some embodiments, an AGS receiver may general perform the opposite operations as the sender. For example, the receiver may, among other things:

receive messages from red side of the date diode if the message destination is not known, it may stage data pending that information. In some embodiments, the data may be forwarded to another service and/or another service may be notified of the reception of the staged data. In some cases, an operator of the receiving system may identify a destination for the staged data.

if the destination is determined, and if the resulting message has not timed out, it may unpack the data and send it on to its final destination(s).

Like the sender, the receiver may be composed of workers to handle data, along with an API service to create and update request metadata.

In some embodiments, the service fronting the data diode may support both streaming and field data transfers. For any transfers of certain types of documents (e.g., PDFs, Word, Excel documents, etc.) into the secure region (also referred to as a "high-side region"), the files may be scanned and posted to a data diode endpoint. After the complete content is uploaded the diode can transfer the entire file as a unit. In some embodiments, file transfer may utilize a notification to the receiving service component that the new file has appeared on the high side. For streaming transfers, a TCP interface may be utilized. For streaming transfers, the stream may be passed through a stream receiver on the high side region. For both file transfer and streaming transfers, a deep content inspection may be required.

In some embodiments, each transfer may provide the following file types:
- Docker images, saved in a tar.gz format. The tar will contain a manifest and files representing each layer of the image. Each layer is in tar format an contains a list of files for the layer.
- Tar.gz files, containing POP images. These may be compressed tar files with a specific structure (they may container a ./run-command/directory with lifecycle scripts under subfolders).

In addition, the following formats may be supported for transfer:
- docker images, unpacked. In other words, we would like the option to transfer the image manifest file (which is JSON) along with each layer tar separately
- chunked data transfer. We want to allow users to segment data they upload on arbitrary byte boundaries. We In some embodiments, as part of an application-level protocol, a manifest may be added to all data transferred into a secure region including:
- a checksum
- information on final artifact destination
- chunk number of chunked transfers In some embodiments, the sending side may programmatically verify that the high side diode is up remotely. The sending side may remotely verify the sending side of the device is making progress. The same may be said of the receiving side. In some embodiments, a device on either side of the air gap may be power cycled.

Figure 5:
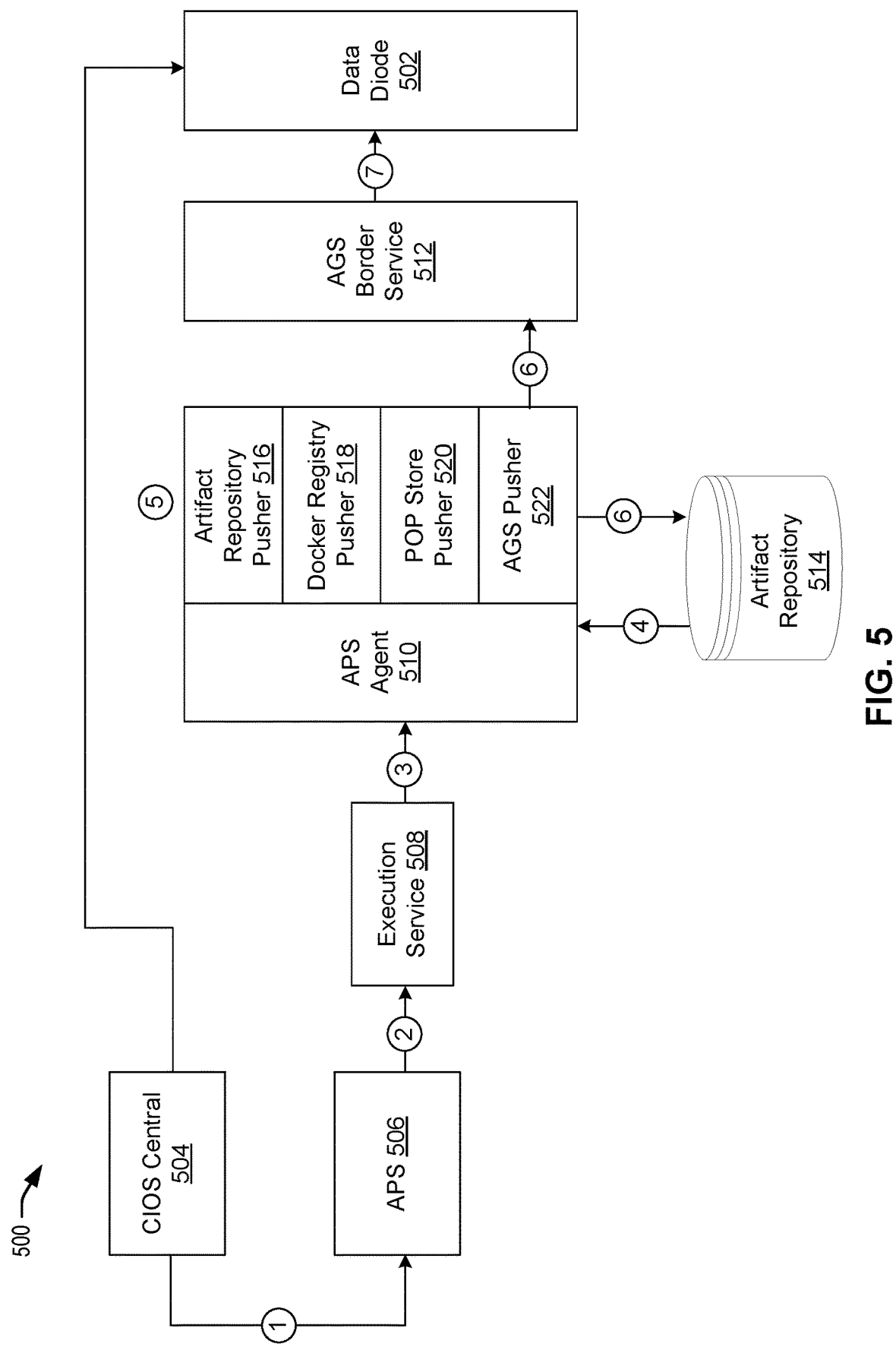
FIG. 5 depicts a system and flow of a method for transmitting data from an unsecure environment via a data diode, according to at least one embodiment.

FIG. 5 depicts a system and flow of a method for transmitting data from an unsecure environment (e.g., unsecure environment 500) via a data diode (e.g., data diode 502), according to at least one embodiment. In the examples provided herein, a "data diode" may include hardware that comprises two COTS rackmount servers. These servers may be outfitted with special hardware: a sending care on one machine and a receiving card on the other, both connected by an optical cable. In some embodiments, the optical cable may be configured to only allow transmission in one direction (e.g., from the sending care to the receiving card). In some embodiments, the physical layer used for a data transfer can be a modified version of Asynchronous Transfer Mode (ATM), that may allow for a larger pack size than what would be available via the standard 53 bytes (5 byte header and 48 bytes of data). In some embodiments, the unsecured environment 500 may be connected to a public network (e.g., the Internet) and/or may have otherwise failed to meet one or more requirements of a secure environment (e.g., a secure region). The particular requirements needed to be considered a secure environment may vary and may be predefined by a sponsor of the secure environment (e.g., a government agency and/or entity, the Central Intelligence Agency (CIA), the Federal Bureau of Investigation (FBI), etc.).

The flow may begin at step 1, where a client within the unsecure environment 500 may initiate a send request. For example, CIOS Central 504 (e.g., CIOS Central 102) may initiate a send request within the unsecure environment 500. In some embodiments, the caller (e.g., CIOS Central 102) may utilize an API exposed by a push service (e.g., application push service (APS) 506) to request that one or more artifacts may be sent. In some embodiments, the data provided via this API may include, but is not limited to, artifact metadata for each artifact (e.g., an artifact name, version, type, destination data (e.g., indicating a destination component for the artifact), and/or a flock identifier (e.g., indicating a particular flock). In some embodiments, this artifact metadata may relate to a deployment to be performed in the secure region. The artifact metadata provided for each artifact may be utilized to authorize crossing between the unsecure environment 500 and a secure region (e.g., the secure region 600 discussed below with respect to FIG. 6). Application push service (APS) 506 may be responsible for ensuring operations for packaging and/or segmenting (e.g., generating one or more data packets and/or breaking data into one or more data packets) according to a predefined protocol. Passing data from the unsecure environment 500 to a secure region may be referred to as "crossing an air-gap."

At step 2, APS 506 may optionally perform a call to execution service 508 to provide the data to be transmitted. In some embodiments, the execution service 508 may be configured to manage one or more APS agents instances (e.g., APS agent 510, a software module or process). APS agent 510 may be configured with code for a push workflow that, when executed, performs any suitable operations for packaging and/or segmenting the data for transmit. In some embodiments, APS 506 may pass the data to be transmitted (e.g., the one or more artifacts and metadata corresponding to the one or more artifacts) to the execution service 508. The execution service 508 may be configured to initiate and/or manage one or more processing instances (e.g., the APS agent 510). Each processing instance may be configured to transmit some portion of the data to the AGS border service 512. In some embodiments, the execution service 508 may be configured with load-balancing functionality to manage tasks submitted to the one or more processing instances. In some embodiments, the functionality of the execution service 508 is encapsulated within APS agent 510 and/or the call at step 2 may directly call the APS agent 510.

By way of example, at step 3, the APS agent 510 may execute any suitable operations for transmitting a portion (e.g., some, all, etc.) of the data that is to be transmitted to a secure region. In some embodiments, the data transmitted between CIOS central 504, APS 506, execution service 508 (optionally), and APS agent 510 may not include some or all of the data to be transmitted via the data diode 502. By way of example, the data transmitted between these components may include metadata corresponding to the data to be transmitted. The metadata may include at least an artifact identifier(s) associated with the artifact(s) to be transmitted.

At step 4, executing the code of the APS agent 510 may execute operations to retrieve the artifact from a storage location (e.g., artifact repository 514, a storage store/memory configured to store artifacts). In some embodiments, the operations may utilize the metadata for retrieval. By way of example, the APS agent 510 may execute a pull request that includes any suitable combination of an artifact identifier (e.g., name), a version, and/or a type corresponding to an artifact to be transmitted. The artifact repository 514 may be configured to utilize the data provided in the pull request to retrieve an artifact (e.g., a software application) that was previously stored and associated with the data. The artifact repository 514 may return the artifact in response to the pull request received at step 4.

At step 5, the code of APS agent 510 may be configured to provide the artifact to a subcomponent (e.g., artifact repository pusher 516, registry pusher 518, plain old process (POP) store pusher 520, and/or air gap service (AGS) pusher 522). In some embodiments, the particular subcomponent may be selected by the APS agent 510 based at least in part on the type provided in the metadata received from execution service 508. In some embodiments, each subcomponent of the APS agent 510 (e.g., artifact repository pusher 516, registry pusher 518, POP store pusher 520, and/or air gap service (AGS) pusher 522) may be configured with executable instructions related to a particular type of artifact. Thus, the subcomponent may execute instructions that are specific for that type. The number of subcomponents of APS agent 510 may vary based at least in part on the number of differing types of data may be transmitted via the data diode 502.

The subcomponents of the APS agent 510 may individually be configured to package binary data of the artifact into a package according to a predefined protocol associated with data transmission over an airgap. In some embodiments, the subcomponent (e.g., artifact repository pusher 516) may utilize any suitable portion of the metadata received from execution service 508 to perform such operations. These operations may include generating and/or breaking the artifact (e.g., the binary data defining the artifact) into one or more data packets to be transmitted via the data diode 502. In some embodiments, the subcomponents of the APS agent 510 may be configured to digitally sign the data before transmitting the data to the AGS border service 512 at step 6. By way of example, a subcomponent (e.g., the artifact repository pusher 516) may be configured with a private key of a private/public key pare. The private key may be known only to the subcomponent (e.g., the artifact repository pusher 516) while the public key may be known to one or more other computing devices/components. In some embodiments, the private key may be specific to the APS agent 510 or the APS 506 rather than the particular subcomponent. The private/public key pair may be configured such that data encrypted with the private key, may be verified using the public key. By way of example, the artifact repository pusher 516 may be configured to utilize a private key to generate a digital signature. The digital signature may be generated utilizing any suitable mathematical scheme. By way of example, one or more portions of the data and/or the private key may be utilized as input into a mathematical formula to produce a digital signature. In some embodiments, the one or more portions of the data may first be provided to a hashing algorithm to produce an intermediate result and then the intermediate result is then utilized with the private key to generate the digital signature. The digital signature may be included in the data transmitted to the AGS border service 512 and eventually through the data diode 502. The digital signature may be verified by a receiver based at least in part on providing the digital signature and the public key to a predefined formula in order to obtain a second result. In some embodiments, the receiver may also recalculate a hash value from the data received in order to compare it to a hash value obtained from the digital signature. If the hash values match, the receiver can be assured that the data has not been tampered with. Although a private/public key pair (e.g., an asymmetric cryptographic key pair) is discussed, it should be understood that a shared secret may be utilized in a similar manner to authenticate the requestor and/or to verify the integrity of the data transmitted via the data diode 502.

At step 6, the APS agent 510 may transmit the one or more packets to one or more components of the system. By way of example, in some embodiments, the APS agent (e.g., via the artifact repository pusher 516, or another subcomponent) may store the one or more packets within the artifact repository 514 (or another suitable data store/storage location). In some embodiments, the APS agent 510, via the subcomponent that stored the data packet(s), may transmit the data packet(s) to the AGS border service 512 (e.g., via AGS pusher 522). In some embodiments, the AGS border service 512 may be configured as an interface for the data diode 502. In some embodiments, the one or more data packets may be sent in a single transmission/message, or the one or more data packets may be sent in multiple transmissions/messages. By way of example, the subcomponent (e.g., the AGS pusher 522) may handle sequential transmission of the one or more data packets according to a predefined protocol such that it transmits the data packets in an order and manner defined by the predefined protocol to AGS border service 512.

In some embodiments, the AGS pusher 522 may execute (or call another component not depicted to execute) any suitable number of security egress policies. The number and content of these security egress policies may be defined by the secure region sponsor (e.g., the FBI, the CIA, etc.). Some of these security policies may ensure that sensitive information would not be leaked by transmitting the data. By way of example, one security policy may be to check that data being transmitted that is in a given format (e.g., XML) meets a predefined schema definition. Other examples could include ensuring that exiting document sizes are of roughly the expected size (e.g., the actual size is within a predefined threshold range of the expected size), and that the format of data entries meets specific requirements. For example, if the outgoing data is supposed to be billing or metering data, one security policy executed may ensure the text looks like charge items or data points, and not like sensitive data (e.g., IP addresses or service names).

At step 7, the subcomponent (e.g., the artifact repository pusher 516) transmits the data packet(s) received to the data diode 502 (e.g., the sending card that is connected to an optical cable (not depicted)) which allows for transmission only from the data diode 502 and disallows receipt of any data via the data diode 502. Upon receipt, the data diode 502 transmits the data over the optical cable to the data diode 600 of FIG. 6.

Although, the example illustrated in FIG. 5 depicts the data being transmitted to the data diode 502 through the APS 506, the execution service 508, the APS agent 510 and its subcomponent(s), and the AGS border service 512, it should be appreciated that, in some embodiments, CIOS Central 504 may directly communicate with data diode 502. In this example, CIOS Central 504 may be configured to execute any suitable operations for packaging and/or digitally signing the data to be transmitted as discussed with respect to the APS agent 510 and its corresponding subcomponents.

Figure 6:
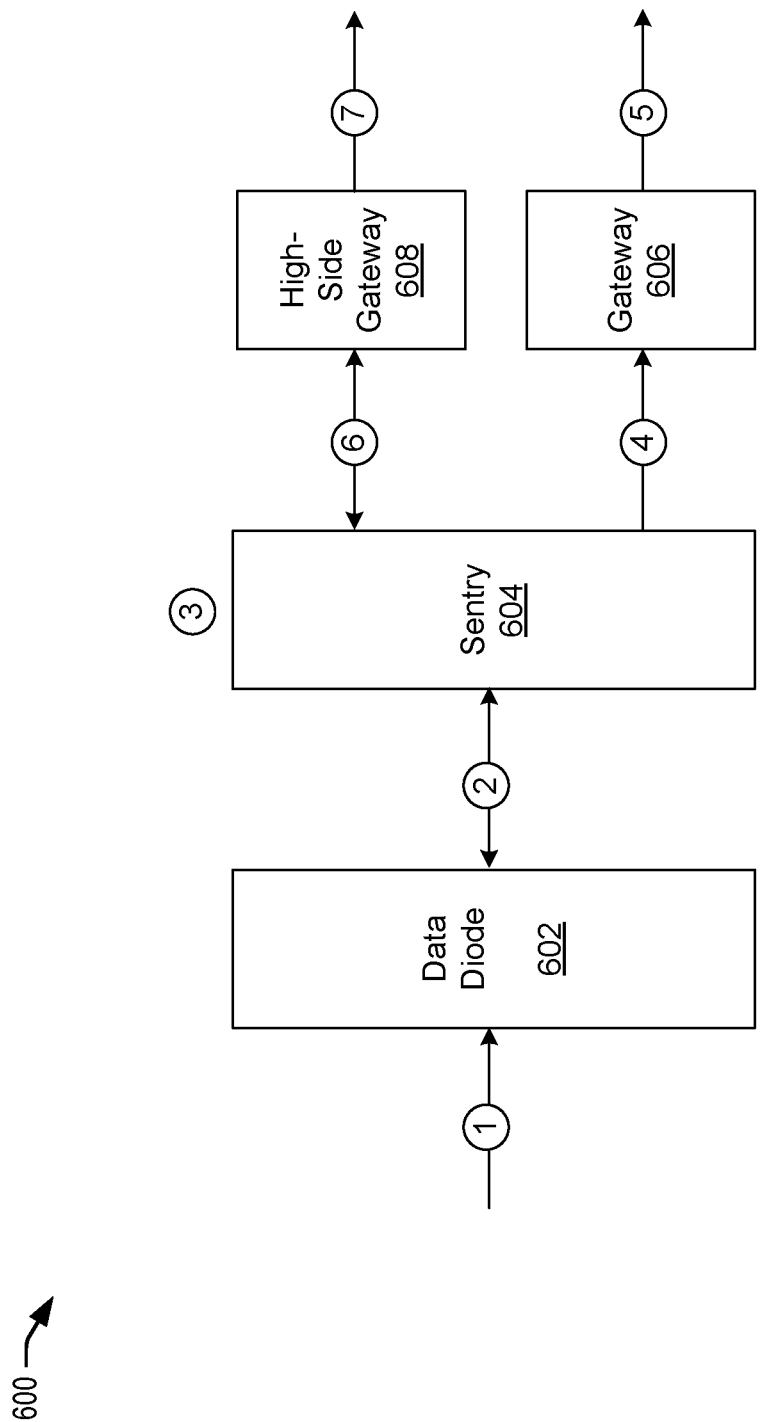
FIG. 6 depicts a system and flow of a method for verifying data received from an unsecure environment via a data diode, according to at least one embodiment.

FIG. 6 depicts a system and flow of a method for verifying data received from an unsecure environment (e.g., unsecure environment 500 of FIG. 5) via a data diode (e.g., data diode 502), according to at least one embodiment. The data diode may include two endpoints: 1) the data diode 502, the sending side (also referred to as a low-side data diode device) and 2) the data diode 602, a receiving side (also referred to as a high-side data diode device).

At step 1, the data may be received at data diode 602. The data may include any suitable portion of one or more artifacts. In some embodiments, the data received may include metadata corresponding to the one or more artifacts.

At step 2, sentry 604, a computing component, may execute operations to poll the data diode 602 for data. Alternatively, the data diode 602 may execute any suitable operations and/or notification service that may provide the data to the sentry 604. In some embodiments, the sentry 604 may operate on the same or a different computing device than the data diode 602. In some embodiments, the low-side to high-side data transfer is performed via the optical cable connecting data diode 502 (e.g., sending hardware such as a sending card) to data diode 602 (e.g., receiving hardware such as a receiving card). In some embodiments, on receipt, the data diode 602 may place/store the received data in a predefined storage location (e.g., a file directory) that is checked by sentry 604 periodically, or according to a predefined schedule.

At step 3, the sentry 604 may identify whether newly received data was received by the data diode 602. By way of example, the sentry 604 may identify that new data is stored in a predefined folder that is configured to be utilized to store data packets received by the data diode 602. In some embodiments, the sentry 604 may be configured to maintain data in order to identify what data packets (e.g., a last data packet) to be received for the artifact to which the data packets relate. In some embodiments, the sentry 604 may be configured to manage any suitable number of receptions corresponding of any suitable number of artifacts. In some embodiments, sentry 604 may be implemented using any suitable number of computing instances (e.g., separate processes that individually execute the operations corresponding to the sentry 604 for a particular data reception instance). In some embodiments, the sentry 604 may be configured to verify the digital signature. By way of example, the sentry 604 may be configured with a key (e.g., a public key) corresponding to the key (e.g., the private key of FIG. 5) that was used to sign the data. In some embodiments, if the verification check succeeds (e.g., the digital signature is verified, the message was sent by an authorized entity and/or is unaltered), the sentry 604 may be configured to cosign the signed data packet. In some embodiments, the sentry 604 may generate its own digital signature utilizing a shared secret known to a component (e.g., CIOS Central 702 of FIG. 7) within a secure region (e.g., secure region 700 of FIG. 7). As another example, the sentry 604 may utilize a private key of a public/private asymmetric cryptographic key pair and the component of the secure region may be configured with the corresponding public key. The digital signature generated by the sentry 604 may be configured to be verifiable to any component that has the corresponding public key (e.g., CIOS Central 702).

In some embodiments (e.g., when the destination is not configured to be able to verify the digital signature received in the data at step 1), the sentry 604 may strip the digital signature received in data packet. At step 4, the sentry 604 then transfers the data packet to the gateway 606, a computing component configured to receive data packets into a secure environment (e.g., the secure environment 700 of FIG. 7). In some embodiments, the data packet may be digitally signed by the sentry 604. In other embodiments, the data packet may be wholly unsigned. The gateway 606 may be configured to forward the data packet to the secure region 700 of FIG. 7.

However, if the destination does have the capability to verify the digital signature received in the data at step 1, the sentry 604 may transmit the verified data packet to the high-side gateway 608, a computing component configured to receive signed data packets (e.g., data packets digitally signed by the sender and/or the sentry 604). In some embodiments, a secure file transfer protocol (SFTP) client on the high-side gateway 610 polls for and pulls files from a secure transport server running on the sentry 604. At step 7, the high-side gateway 608 may transmit the signed data packets to the secure region 700.

Figure 7:
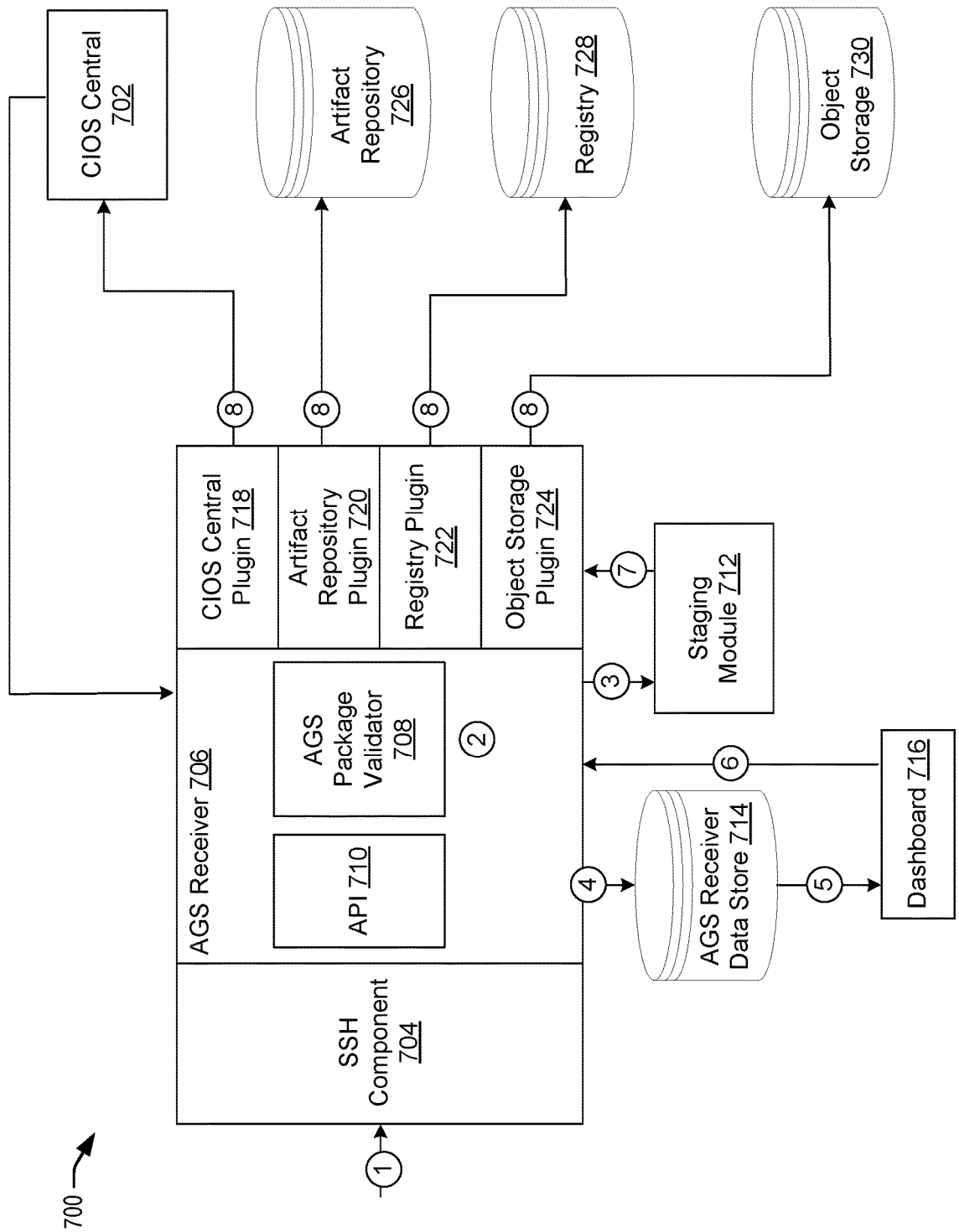
FIG. 7 depicts a system and flow of a method for receiving data from a data diode within a secure region, according to at least one embodiment.

FIG. 7 depicts a system and flow of a method for receiving data from a data diode (e.g., data diode 602, a receiving card) within a secure region 700, according to at least one embodiment. Secure region 700 may be considered to be secure as the secure region 700 may have no access, even indirect access, to any public networks. AGS receiver 704 may be configured to receive data from high-side gateway 610 of FIG. 6. Another AGS receiver (not depicted) may be configured to receive data from gateway 608 of FIG. 6. signature generated in FIG. 5).

At step 1, the data packet may be pushed from the high-side gateway service 610 to a secure transport component 704 of the AGS receiver 706. In some embodiments, the secure transport component 704 may implement a secure transport protocol (e.g., a secure shell (SSH) communications protocol). The data packet may be passed through API 710 to AGS packet validator 708 to invoke the functionality of AGS package validator 708.

At step 2, the AGS package validator 708 may be configured to perform any suitable operations for validating the data packet(s) received. By way of example, the AGS package validator 708 may be configured to validate the data packet(s) received based at least in part on any suitable predefined protocol. In some embodiments, the AGS package validator 708 may be configured to verify the digital signature provided by the sentry 604 of FIG. 6.

At step 3, if the data packet is verified the AGS package validator 708 may extract the data of the data packet and pass the extracted data to the staging module 712, a component configured to store extracted data from one or more data packets during the process of transferring an artifact from the unsecured environment 500 to the secure region 700. In some embodiments, the staging module 712 may be passed and may utilize any suitable portion of the metadata received with the data packets in order to perform any suitable staging operations. Said another way, the AGS package validator and/or the staging module 712 may execute any suitable operation using the metadata provided with the data packet in order to reconstruct the artifact from one or more data packet(s) received.

At step 4, once the artifact (e.g., a release document, a software artifact, etc.) is staged, the AGS receiver 706 may execute operations to store information related to the data packet (e.g., the metadata, the extracted data, etc.) within the AGS receiver data store 714, a storage location configured to store such information. In some embodiments, the information within the AGS receiver data store 714 may be utilized to update a dashboard (e.g., a user interface such as dashboard 716) at step 5. Dashboard 716, in some embodiments, may include a user interface of CIOS Central 702 (e.g., a local copy of CIOS Central 102 of FIG. 1 that executes within secure region 700). In some embodiments, a user may be required to approve the reception of the artifact.

At step 6, user input received at the dashboard 716 (e.g., a user interface) may be transmitted to the AGS receiver 706. If the user input indicates artifact reception is restricted/not allowed, the AGS receiver 706 may be configured to perform operations to delete any data previously stored in connect with the artifact. In some embodiments, this user input may additionally cause the AGS receiver 706 to discard or otherwise ignore any subsequent data packets received that are associated with the disallowed artifact. However, if the user input indicates the reception of the artifact is allowed/approved, the AGS receiver 706 may be configured to receive any suitable number of data packets until staging is complete (e.g., a last data packet for the artifact has been received, extracted, and stored within staging module 712).

At step 7, the staging module 712 may transfer the completely reconstructed artifact and corresponding metadata to a corresponding component that is configured to push the artifact to a destination computing component as indicated by the metadata. The AGS receiver 706 may be configured with any suitable number of components that are individually configured to push data to a particular computing component of the secure region. By way of example, as depicted, AGS receiver 706 may be configured with CIOS Central plugin 718, artifactory plugin 720, registry plugin 722, and object storage plugin 724. In the example depicted, CIOS Central plugin 718 may be configured to push the fully constructed artifact to CIOS Central 702 as indicated in the metadata. Likewise, artifactory plugin 720 may be configured to push the constructed artifact to artifactory 726, registry plugin 722 may be configured to push the constructed artifact to registry 728, and object storage plugin 724 may be configured to push the constructed artifact to object storage 730. It should be appreciated that the metadata may identify one or more destinations for the artifact, therefore any suitable combination of one or more push components (e.g., CIOS Central plugin 718, artifactory plugin 720, registry plugin 722, and object storage plugin 724) may be invoked based at least in part on the metadata. In some embodiments, the particular push component(s) utilized may depend, at least in part, on a type associated with the artifact and obtained from the metadata. The components 718-724 may be utilized to transferred to its final resting place. The transfer process may be dependent on the destination and content type. For example, the same artifact (e.g., image content) may be archived and transferred as a single file if the destination is object storage 730, or pushed layer by layer (e.g., each data packet sequentially) if the registry 728 is the destination. For large artifacts (e.g., artifacts over a threshold size), multi-part transfers may be used when the destination supports it. Any of the destinations depicted in FIG. 8 may, in some embodiments, support multi-part transfers.

As a specific example of the flow 500-700, APS 506 of FIG. 5 may receive a request (e.g., a sending request) to push a POP image with a given tag for a particular application. This request may be received from CIOS Central 504. FIG. 8 illustrates example call parameters for that sending request, according to at least one embodiment.

Next, APS 506 calls the execution service 508 which tasks APS agent 510 to transmit the POP image. APS 506 may pull the POP image from artifact repository 514 and create an AGS package to contain it. The package may correspond to one or more data packets needed to transmit the POP image. In some embodiments, the APS 506 may generated metadata corresponding to the package.

Figure 9:
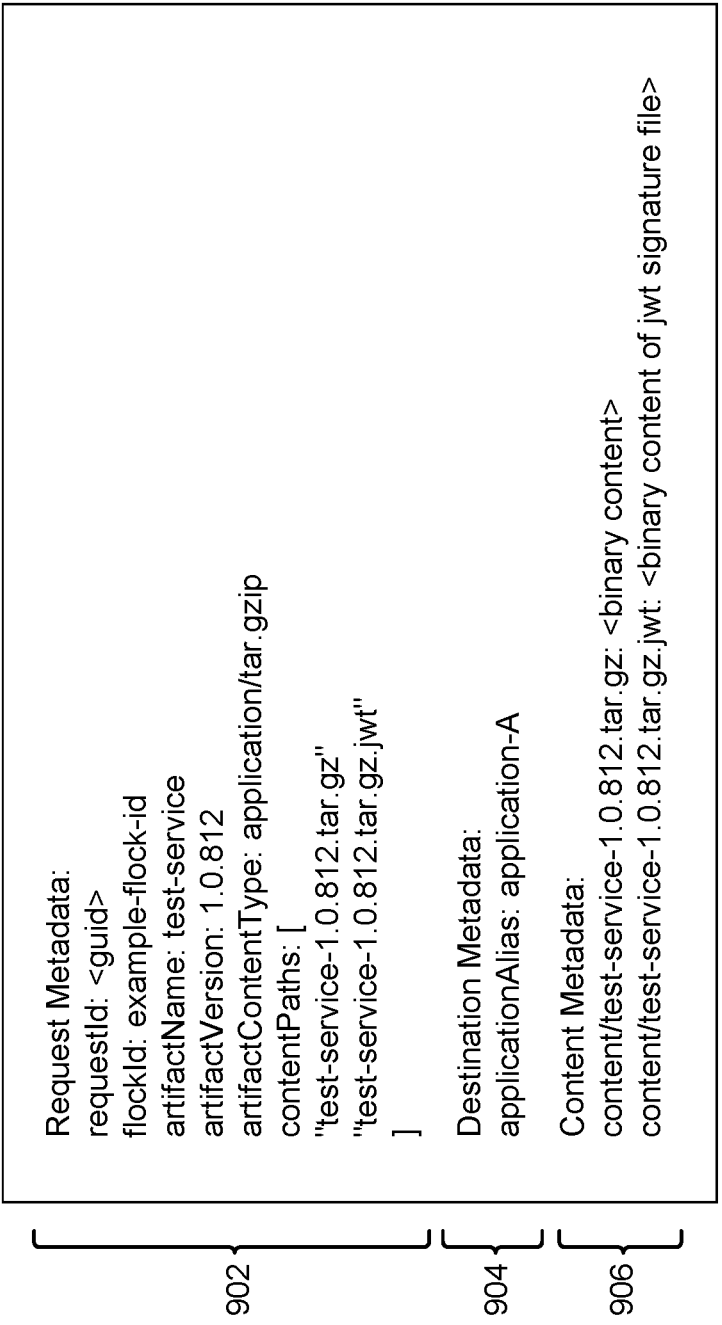
FIG. 9 illustrates example metadata corresponding to a data transfer perform via a data diode, in accordance with at least one embodiment.

FIG. 9 illustrates example metadata corresponding to a data transfer perform via a data diode, in accordance with at least one embodiment. In some embodiments, the metadata may include request metadata 902, destination metadata 904, and/or content metadata 906. Each form of metadata 902-906 may include any suitable information related to its corresponding component (e.g., request, destination, or content). By way of example, request metadata 902 for the artifact (e.g., an image) may include a request identifier (requestID), a flock identifier (flockID), a name of the image (artifactName), a version of the image (e.g., artifactVersion), a type of the content of the artifact (e.g., artifactContentType), one or more paths/packages that contain the artifact (e.g., contentPaths). In some embodiments, the destination metadata 904 may include one or more identifiers for one or more destination applications (e.g., application Alias). In some embodiments, content metadata 906 may include one or more paths/packages containing the binary content of the image and/or the binary content of a digital signature file corresponding to the image). In some embodiments, content metadata 906 may include a packet number, a transfer type, a digital signature, and/or any suitable combination of the data fields of FIG. 10.

Returning to the example, the APS 506 selects a particular subcomponent (e.g., POP store pusher 520) to generate one or more data packets and corresponding metadata. The subcomponent may utilize any suitable data to maintain a status corresponding to the data transmission. FIG. 10 illustrates a set of data fields for monitoring data transmission, in accordance with at least one embodiment. The transmitting subcomponent (e.g., POP store pusher 520) may utilize each of the fields of FIG. 10 (or some suitable combination including all of the required fields) to manage awareness of a given data transmission. In some embodiments, for example, the subcomponent may number the data packets (e.g., with a partNumber indicating a sequence for multiple data packets) according to a predefined transmission protocol such that the receiver may reconstruct the content from various data packets using the part number. The subcomponent may maintain a start time for the data transfer and a time the transfer was completed (or deemed failed). In some embodiments, the subcomponent may maintain a status (e.g., succeeded, failed, in progress, etc.) corresponding to the data transfer. Any suitable combination of the data fields of FIG. 10 may be provided via any suitable number of user interfaces provided by CIOS central 502. Thus, a user of the system may be notified of the progress of this particular data transfers (as well as any data transfer performed/attempted by the system).

Once the APS 506's subcomponent (e.g., POP store pusher 520) generates the data packet(s) and corresponding metadata for the transmission(s), it may forward the data packet(s) to data diode 502 through AGS border service 512. The data packet(s) may then be transmitted to data diode 602 of FIG. 6 via the optical cable connecting data diodes 502 and 602. The sentry may validate the signature and determine a destination based at least in part on the type associated with the data packet. The sentry 506 may then forward to an appropriate gateway (e.g., gateway 610 or gateway 612 of FIG. 6). The data packets are then received at the secure region 602 and processed by the AGS receiver 706.

AGS receiver 706 receives one or more data packets, extracts request and destination metadata, and stages content locally on disk (e.g., via the staging module 712). AGS receiver 706 may maintain any suitable data for monitoring the reception of the one or more artifacts being sent through data diode 602. FIG. 11 illustrates a set of data fields for monitoring data reception, in accordance with at least one embodiment. In some embodiments, the AGS receiver 706 may save the metadata received from the data diode within the depicted data fields. The AGS receiver 706 may further be configured to maintain an address corresponding to the staging module (e.g., stagingAddress) to indicate an address (e.g., URL) where the artifact is being staged. The staging address may be predefined or selected by the AGS receiver 706 according to a predefined scheme. Based on content type and destination metadata, AGS receiver 706 may query a local database (not depicted) with the applicationAlias obtained from the destination metadata to obtain an identifier/destination of an application that lives in service enclave. Because this is a POP artifact for a Service enclave application, the AGS receiver 706 selects the POP store (e.g., object storage 730) as the artifact destination.

The AGS receiver 706 may connect (e.g., via the object storage plugin 724) to the object storage 730 with a privileged MTLS client certificate. This authenticates the AGS receiver 706 as a privileged client authorized to write artifacts. The AGS receiver 706 then pushes the extracted/reconstructed content to the object storage 730.

Figure 12:
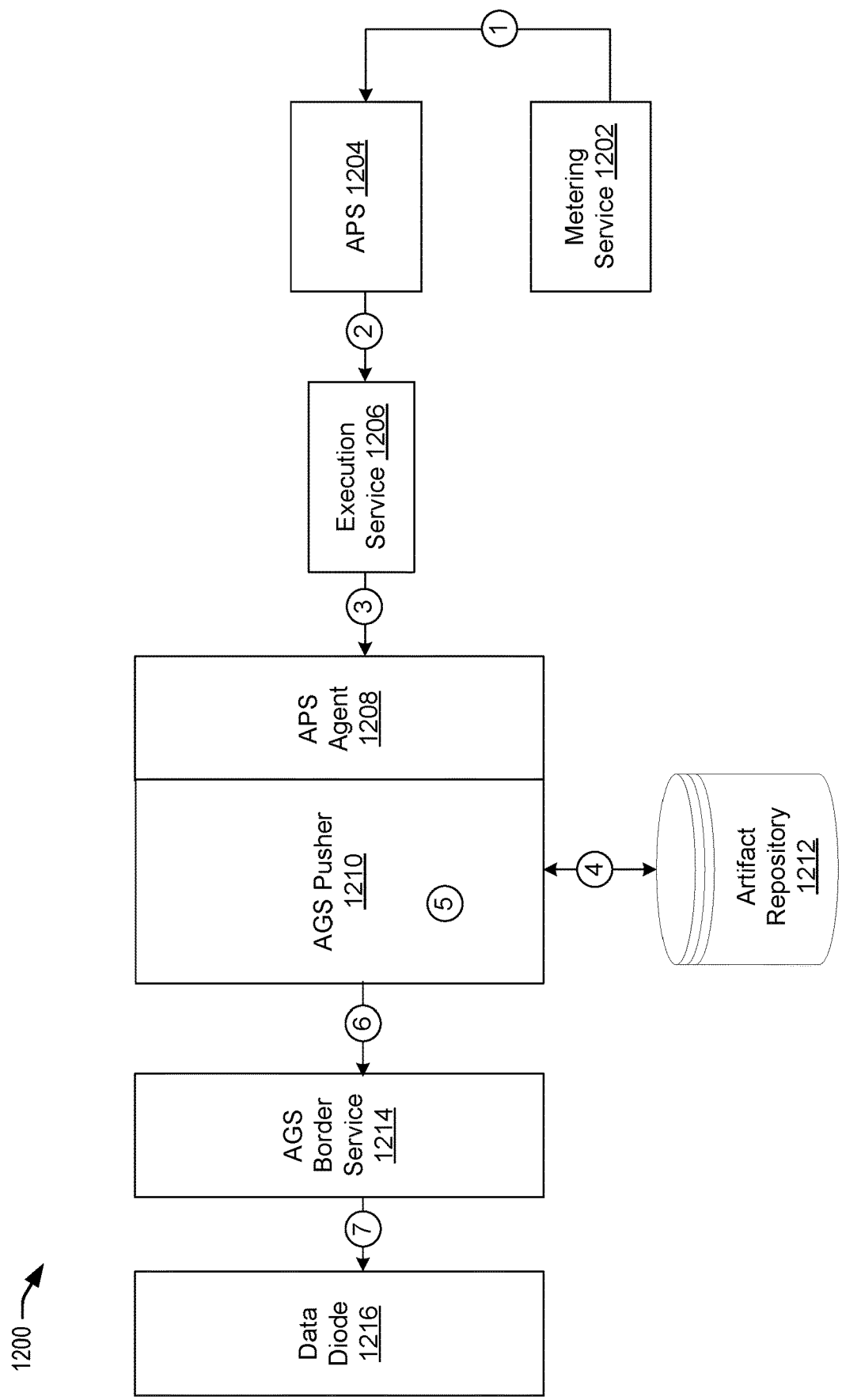
FIG. 12 depicts a system and flow of a method for transmitting metering data from a secure region via a data diode, according to at least one embodiment.

FIG. 12 depicts a system and flow of a method for transmitting metering data from a secure region via a data diode, according to at least one embodiment. The metering data may be generated within secure region 1200 (e.g., secure region 700). In some embodiments, metering data for managing payment and/or use of a given resource may be desired in the unsecured environment 500. Thus, the metering data may be transferred from secure region 1200 to unsecured environment 1300 of FIG. 13 (e.g., an example of the unsecured environment 500 of FIG. 5).

A metering service 1202 may be utilized to generate metering metric that indicate a particular amount of use of one or more resources of the secure region. By way of example, the metering metric may provide metrics corresponding to an amount of memory utilized by a resource corresponding to a particular user/entity (e.g., a tenant). The metering service 1202 may transmit the metering data to APS 1204 (e.g., an example of APS 504 of FIG. 5) and metadata corresponding to the metering data that indicates a type of metadata and a destination for the metering data.

At step 3, the APS 1204 may perform a call to execution service 1206 to provide the metering data (and, in some embodiments, corresponding metadata). In some embodiments, the execution service 1206 may be configured to manage one or more APS agents instances (e.g., APS agent 1208, an example of the APS agent 510 of FIG. 5). APS agent 1208 may be configured with code for a push workflow that, when executed, performs any suitable operations for packaging and/or segmenting the data for transmit. In some embodiments, APS 1204 may pass the data to be transmitted (e.g., the one or more artifacts and metadata corresponding to the one or more artifacts) to the execution service 1206. The execution service 1206 may be configured to initiate and/or manage one or more processing instances (e.g., the APS agent 1208). Each processing instance may be configured to transmit some portion of the data to the AGS border service 1214 (e.g., via AGS pusher 1210). In some embodiments, the execution service 1206 may be configured with load-balancing functionality to manage tasks submitted to the one or more processing instances. In some embodiments, the functionality of the execution service 1206 is encapsulated within APS agent 1208 and/or the call at step 2 may directly call the APS agent 1208 and pass the data to be transmitted.

At step 4, the AGS pusher 1210 may be configured to store the metering data and/or metadata in storage (e.g., the artifactory 1214) prior to or after transmission of the metering data. In some embodiments, the AGS pusher 1210 may be configured to generate from the metering data, one or more data packets and/or corresponding information in preparation for transmitting the metering data. The data stored in the artifactory 1212 may include these data packets.

At step 5, the AGS pusher 1210 may execute (or may cause another component not depicted to execute) any suitable number of security egress policies. The number and content of these security egress policies may be defined by the secure region sponsor (e.g., the FBI, the CIA, etc.). Some of these security policies may ensure that sensitive information would not be leaked by transmitting the data. By way of example, one security policy may be to check that data being transmitted that is in a given format (e.g., XML) meets a predefined schema definition. Other examples could include ensuring that exiting document sizes are of roughly the expected size (e.g., the actual size is within a predefined threshold range of the expected size), and that the format of data entries meets specific requirements. For example, if the outgoing data is supposed to be billing or metering data, one security policy executed may ensure the text looks like charge items or data points, and not like sensitive data (e.g., IP addresses or service names).

At step 6, the AGS pusher 1210 may transmit the one or more data packets to the AGS border service 1214. The AGS border service 1214 may then in turn transmit the one or more data packets and corresponding metadata to the data diode 1216. The data may be received and verified in a similar manner as discussed in FIG. 6 where the verified data is then passed to the data diode 1302 of FIG. 13. The data diode 1216 and the data diode 1302 may be connected via a one-way optical cable that allows transmission from the data diode 1302 to the data diode 1216. This is a different cable then the one used to connect data diode 502 to the data diode 602. In some embodiments, the data diode 1216 is a sending card and the data diode 1302 is a receiving card.

Figure 13:
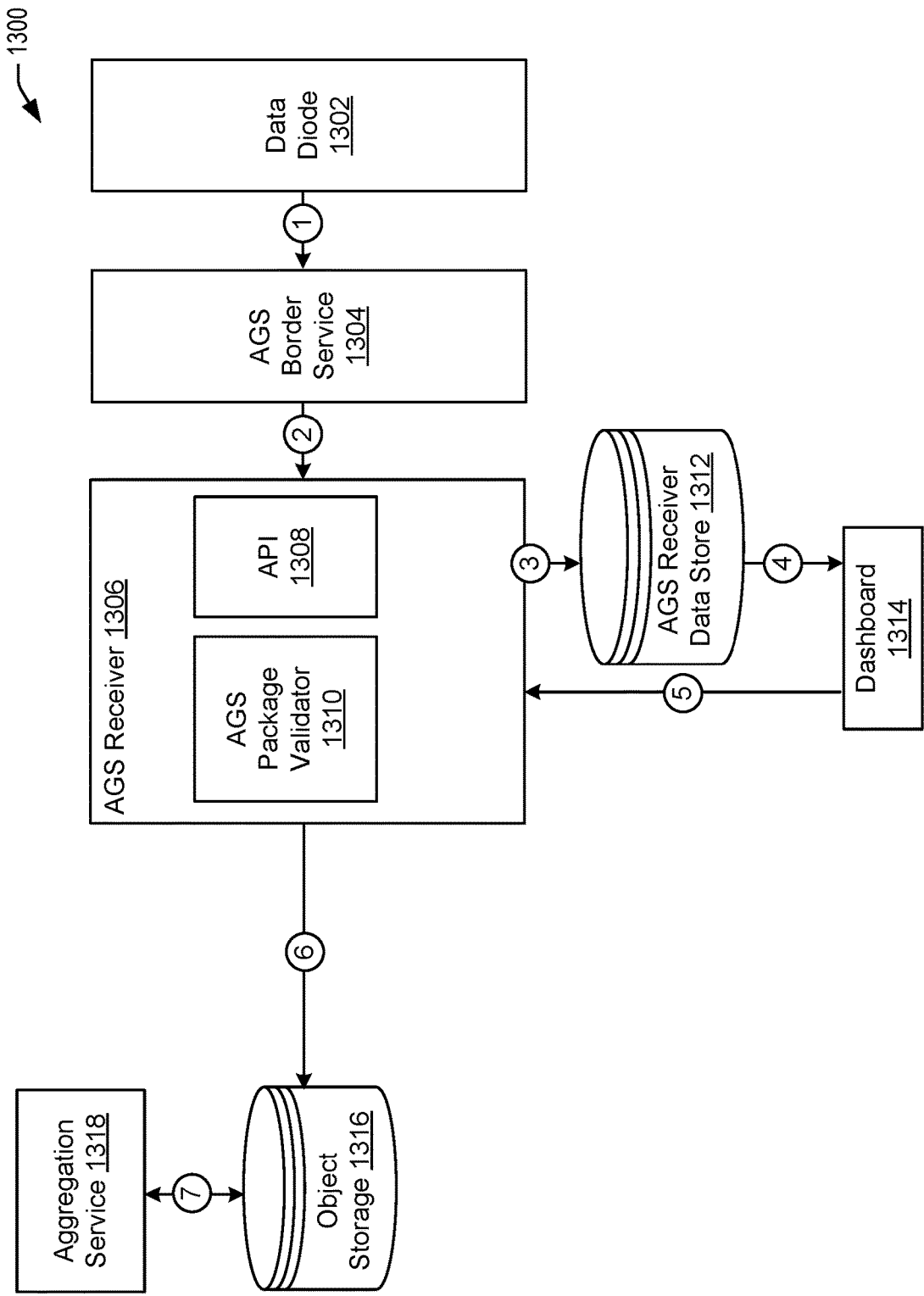
FIG. 13 depicts a system and flow of a method for receiving metering data from a secure region via a data diode, according to at least one embodiment.

FIG. 13 depicts a system and flow of a method for receiving metering data from a secure region via a data diode, according to at least one embodiment. In some embodiments, the components of FIG. 13 may reside in unsecured environment 500 of FIG. 5. The data received by data diode 1302 may be transmitted to the AGS border service 1304 (e.g., AGS border service 512 of FIG. 5) at step 1.

At step 2, the AGS border service 1304 may transmit the data packet to the AGS receiver 1306 (e.g., an example of the AGS receiver 706 of FIG. 7) via application programming interface (API) 1308. The AGS receiver 1306 may call AGS package validator 1310 to perform any suitable operations for verifying the integrity of the data received from the data diode 1302.

At step 3, the AGS receiver 1306 may execute operations to store information related to the data packet (e.g., the metadata, the extracted data, etc.) within the AGS receiver data store 1312, a storage location configured to store such information. In some embodiments, the information within the AGS receiver data store 1312 may be utilized to update a dashboard (e.g., a user interface such as dashboard 1314) at step 4. Dashboard 1314, in some embodiments, may include a user interface of CIOS Central 502 of FIG. 5. The dashboard may be any suitable user interface that may be utilized to notify a user of the receipt and/or content of the metering data.

At step 5, user input received at the dashboard 1314 (e.g., a destination for the metering data) may be transmitted to the AGS receiver 1306. At step 6, the AGS receiver 1306 may utilize the user input to transmit the metering data to a storage destination (e.g., object storage 1316 as indicated in the user input). The storage location (e.g., object storage 1316) may be utilized to update information presented by an aggregation service 1318. At step 7, the aggregation service 1318 may be configured to aggregate, in any suitable manner, metering data for display to the user. By way of example, in some embodiments, the aggregation service 1318 may poll the storage location (e.g., object storage 1316) for the metering data or in other embodiments, the metering data may be provided by the object storage 1316 to the aggregation service 1318.

Figure 14:
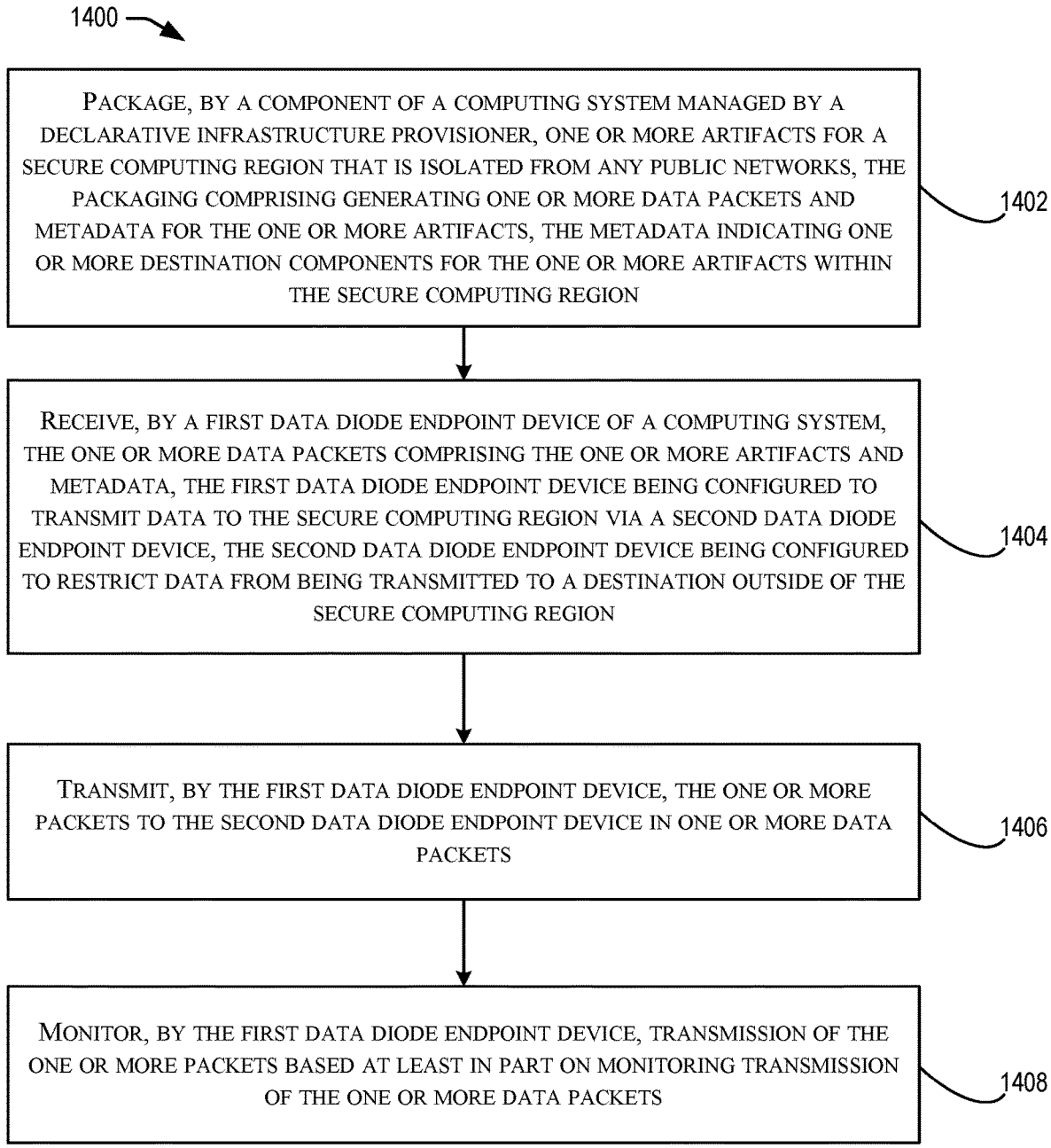
FIG. 14 illustrates an example flow diagram for implementing techniques of a CIOS, according to certain embodiments of the present disclosure.

FIG. 14 illustrates an example flow diagram showing process 14 for implementing techniques of a CIOS, according to certain embodiments of the present disclosure. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, the process may be performed under the control of one or more computing devices or computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. In some embodiments, the process 1400 may be performed by a plurality of processors in parallel. The computer-readable storage medium may be non-transitory.

The process 1400 may begin at block 1402, where one or more artifacts (e.g., an image) are packaged (e.g., by a subcomponent of the APS agent 510 of FIG. 5) for transmission to a secure computing region (e.g., the secure region 700 of FIG. 7). The packaging may be performed by a component (e.g., the POP store pusher 520) of a computing system that is managed by a declarative infrastructure provisioner (e.g., CIOS Central 504). In some embodiments, the secure computing region is isolated from any public networks. In some embodiments, the packaging comprises generating one or more data packets and metadata for the one or more artifacts (e.g., the image). In some embodiments, the metadata (e.g., the destination metadata 904 of FIG. 9) indicates one or more destination components for the one or more artifacts within the secure computing region.

At 1404, the one or more data packets comprising the one or more artifacts and metadata are received by a first data diode endpoint device (e.g., data diode 502 of FIG. 5). In some embodiments, the first data diode endpoint device is configured to transmit data to the secure computing region via a second data diode endpoint device (e.g., the data diode 602 of FIG. 6). In some embodiments, the second data diode endpoint device is configured to restrict data from being transmitted to a destination outside of the secure computing region. By way of example, the second data diode endpoint device may perform one or more operations to determine whether the data meets one or more predefined conditions. Additionally, or alternatively, these operations may be performed by CIOS Central 504, the APS agent 510, a subcomponent of the APS agent 510, or the AGS border service 512. The particular conditions and/or operations performed to determine whether the conditions have been met depends on the sponsor of the secure environment. Thus, in some embodiments, these conditions are determined pre-run time, and the conditions are checked prior to transmission.

At 1406, the one or more packets are transmitted by the first data diode endpoint device (e.g., the data diode 502) to the second data diode endpoint device (e.g., the data diode 602) in one or more data packets. The one or more packets may be transmitted by the subcomponent of the APS agent 510 in according with a predefined transmission protocol.

At 1408, transmission of the one or more packets may be monitored by the first data diode endpoint device (e.g., the data diode) based at least in part on monitoring transmission of the one or more data packets. Additionally, or alternatively, these operations may be performed by CIOS Central 504, the APS agent 510, a subcomponent of the APS agent 510, or the AGS border service 512. If, through the monitoring, the monitoring component recognizes a transmission error has occurred, a data packet has not successfully transmitted, a system failure has occurred, or the like, the monitoring component may execute any suitable operations for notifying the user of the situation. As a non-limiting example, the monitoring component (e.g., the first data diode endpoint device, the APS agent 510, the AGS border service 512, etc.) may transmit data to CIOS Central 504 to present, via a user interface, data to the user indicating the situation.

Illustrative Systems

Figure 15:
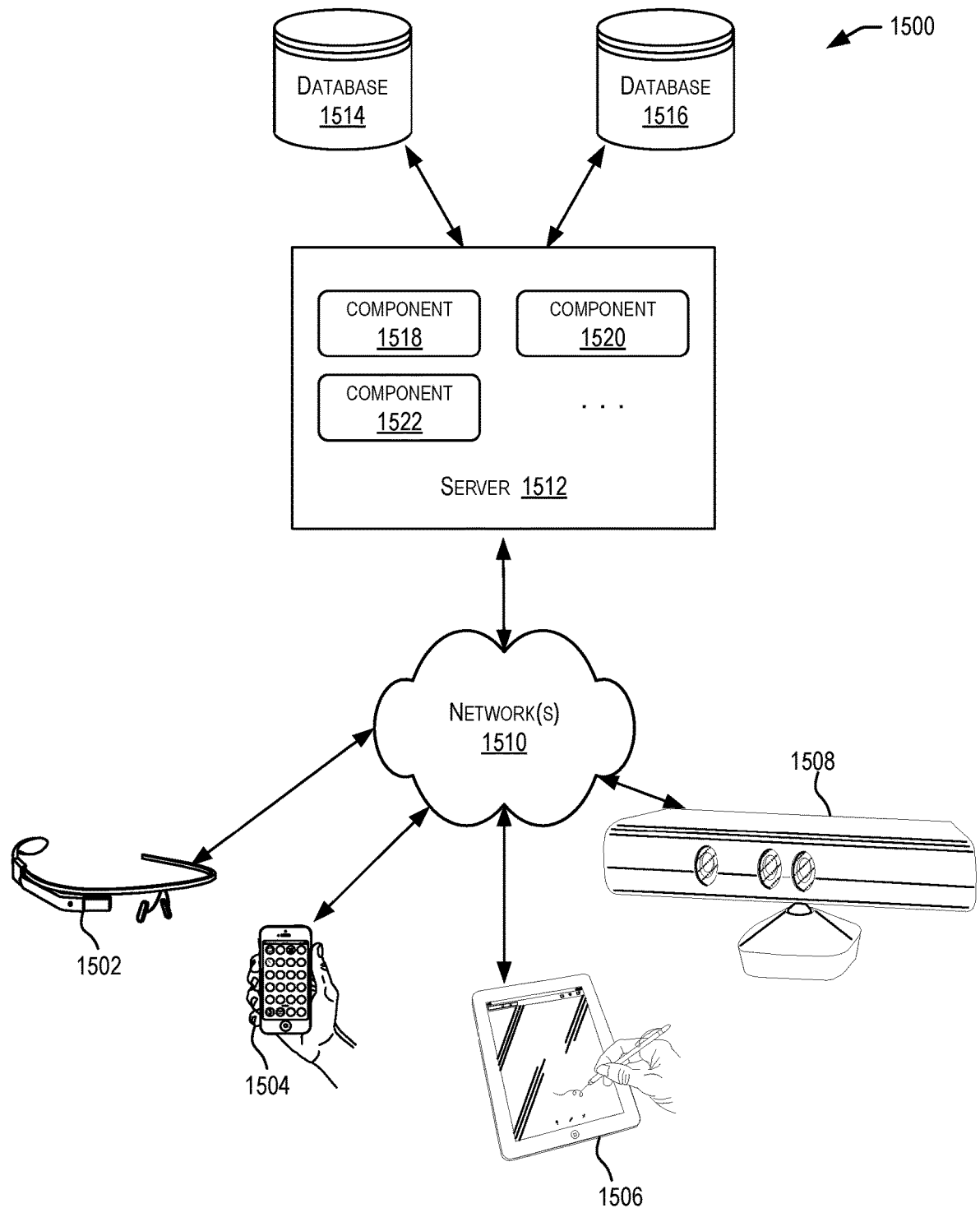
FIG. 15 is a block diagram of a distributed system, according to at least one embodiment.
Figure 16:
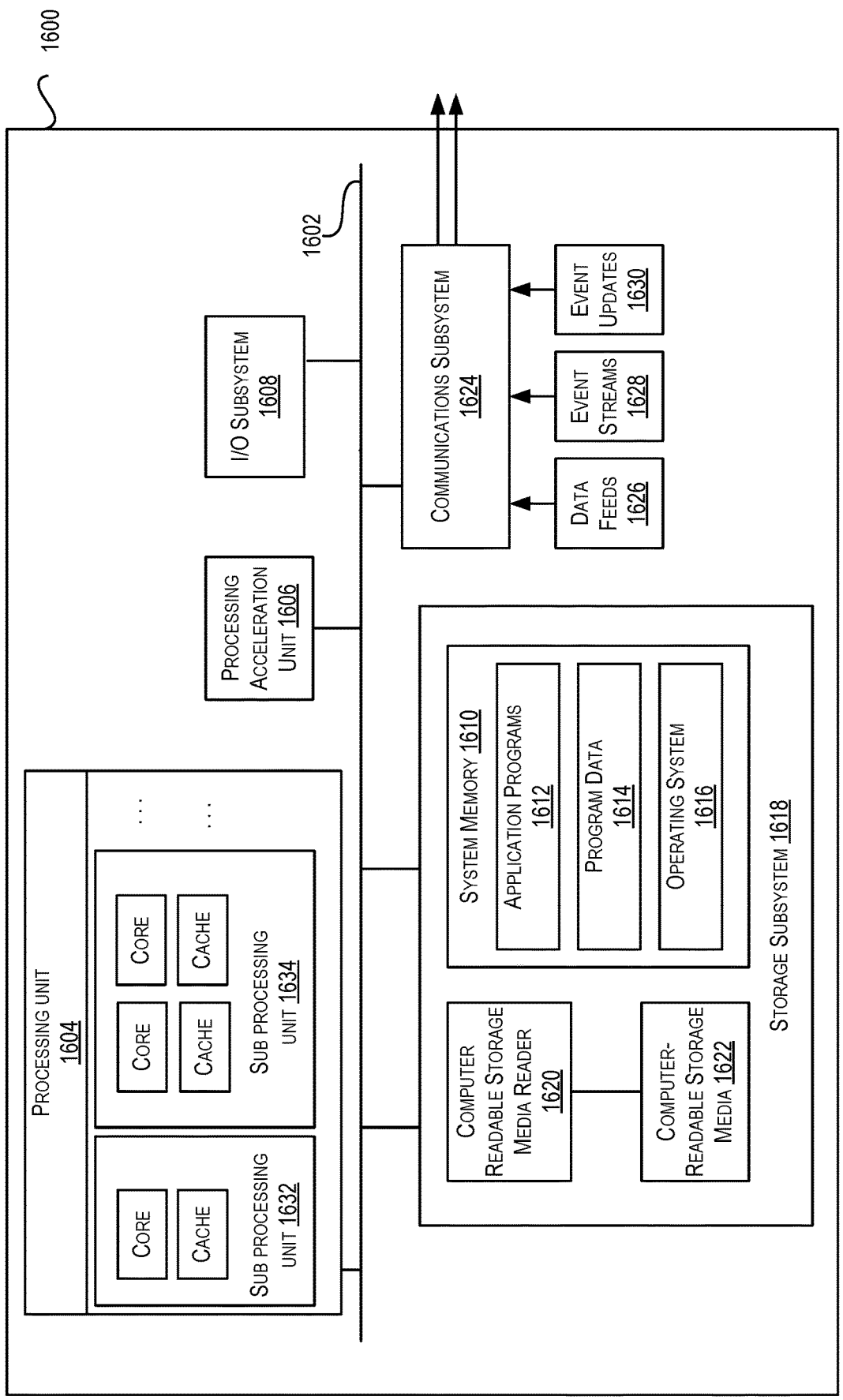
FIG. 16 is a block diagram of one or more components of a system environment by which services provided by one or more components of an embodiment system may be offered as cloud services, according to at least one embodiment.
Figure 17:
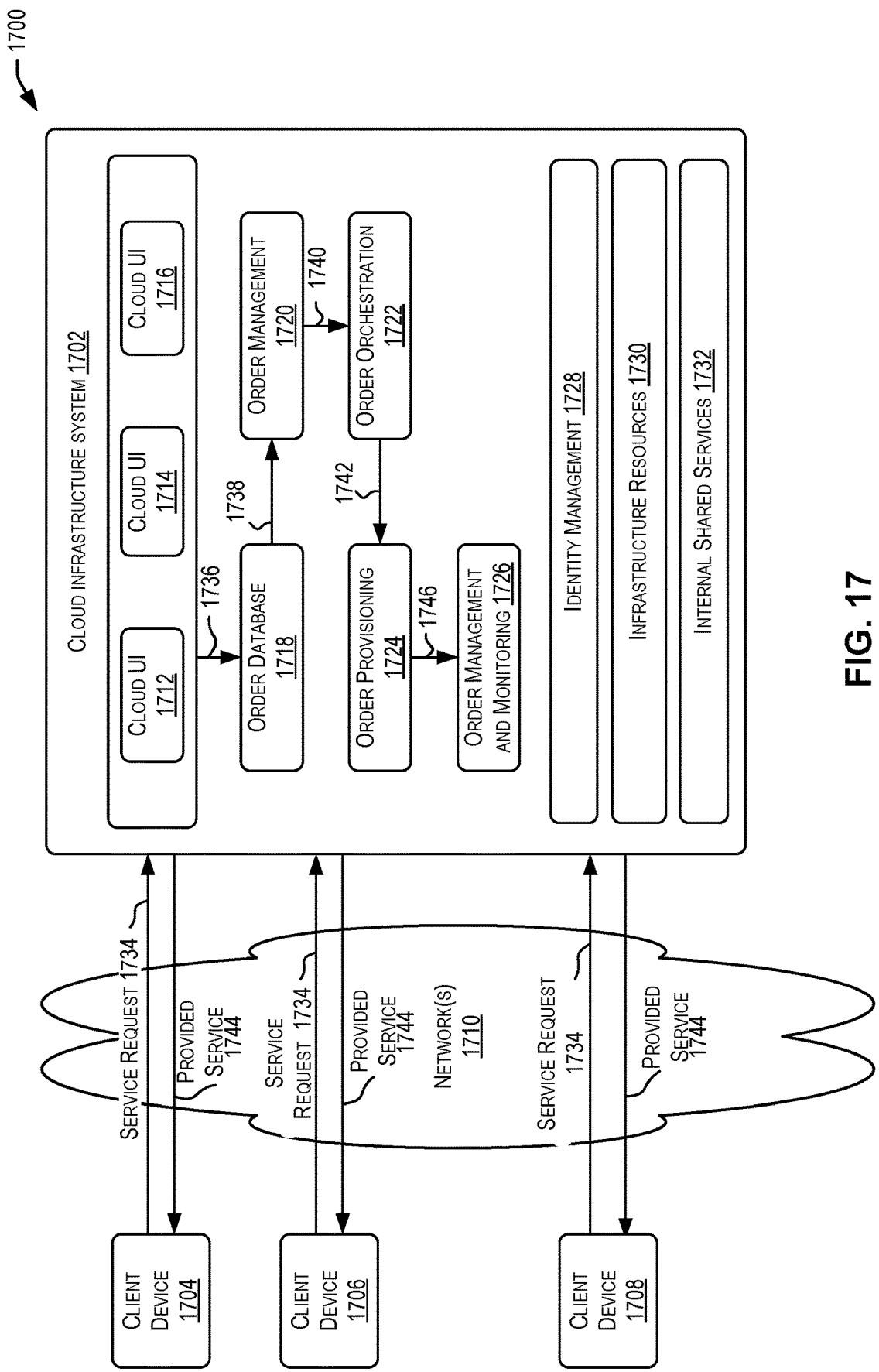
FIG. 17 is a block diagram of an example computer system, in which various embodiments of the present disclosure may be implemented.

FIGS. 15-17 illustrate aspects of example environments for implementing aspects of the present disclosure in accordance with various embodiments. FIG. 15 depicts a simplified diagram of a distributed system 1500 for implementing an embodiment of the present disclosure. In the illustrated embodiment, the distributed system 1500 includes one or more client computing devices 1502, 1504, 1506, and 1508, which are configured to execute and operate a client application such as a web browser, proprietary client (e.g., Oracle Forms), or the like over one or more network(s) 1510. The server 1512 may be communicatively coupled with the remote client computing devices 1502, 1504, 1506, and 1508 via network 1510.

In various embodiments, the server 1512 may be adapted to run one or more services or software applications such as services and applications that provide identity management services. In certain embodiments, the server 1512 may also provide other services or software applications can include non-virtual and virtual environments. In some embodiments, these services may be offered as web-based or cloud services or under a Software as a Service (SaaS) model to the users of the client computing devices 1502, 1504, 1506, and/or 1508. Users operating the client computing devices 1502, 1504, 1506, and/or 1508 may in turn utilize one or more client applications to interact with the server 1512 to utilize the services provided by these components.

In the configuration depicted in FIG. 15, the software components 1518, 1520 and 1522 of system 1500 are shown as being implemented on the server 1512. In other embodiments, one or more of the components of the system 1500 and/or the services provided by these components may also be implemented by one or more of the client computing devices 1502, 1504, 1506, and/or 1508. Users operating the client computing devices may then utilize one or more client applications to use the services provided by these components. These components may be implemented in hardware, firmware, software, or combinations thereof. It should be appreciated that various different system configurations are possible, which may be different from distributed system 1500. The embodiment shown in FIG. 15 is thus one example of a distributed system for implementing an embodiment system and is not intended to be limiting.

The client computing devices 1502, 1504, 1506, and/or 1508 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1510.

Although distributed system 1500 in FIG. 15 is shown with four client computing devices, any number of client computing devices may be supported. Other devices, such as devices with sensors, etc., may interact with the server 1512.

The network(s) 1510 in the distributed system 1500 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1510 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.16 suite of protocols, Bluetooth®, and/or any other wireless protocol), and/or any combination of these and/or other networks.

The server 1512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1512 can include one or more virtual machines running virtual operating systems, or other computing architectures involving virtualization. One or more flexible pools of logical storage devices can be virtualized to maintain virtual storage devices for the server. Virtual networks can be controlled by the server 1512 using software defined networking. In various embodiments, the server 1512 may be adapted to run one or more services or software applications described in the foregoing disclosure. For example, the server 1512 may correspond to a server for performing processing as described above according to an embodiment of the present disclosure.

The server 1512 may run an operating system including any of those discussed above, as well as any commercially available server operating system. Server 1512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Example database servers include without limitation those commercially available from Oracle, Microsoft, Sybase, IBM (International Business Machines), and the like.

In some implementations, the server 1512 may include one or more applications to analyze and consolidate data feeds and/or event updates received from users of the client computing devices 1502, 1504, 1506, and 1508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1512 may also include one or more applications to display the data feeds and/or real-time events via one or more display devices of the client computing devices 1502, 1504, 1506, and 1508.

The distributed system 1500 may also include one or more databases 1514 and 1516. These databases may provide a mechanism for storing information such as user identity information, and other information used by embodiments of the present disclosure. Databases 1514 and 1516 may reside in a variety of locations. By way of example, one or more of databases 1514 and 1516 may reside on a non-transitory storage medium local to (and/or resident in) the server 1512. Alternatively, the databases 1514 and 1516 may be remote from the server 1512 and in communication with the server 1512 via a network-based or dedicated connection. In one set of embodiments, the databases 1514 and 1516 may reside in a storage-area network (SAN). Similarly, any necessary files for performing the functions attributed to the server 1512 may be stored locally on the server 1512 and/or remotely, as appropriate. In one set of embodiments, the databases 1514 and 1516 may include relational databases, such as databases provided by Oracle, that are adapted to store, update, and retrieve data in response to SQL-formatted commands.

FIG. 16 illustrates an example computer system 1600 that may be used to implement an embodiment of the present disclosure. In some embodiments, computer system 1600 may be used to implement any of the various servers and computer systems described above. As shown in FIG. 16, computer system 1600 includes various subsystems including a processing subsystem 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 may include tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1604 controls the operation of computer system 1600 and may comprise one or more processing units 1632, 1634, etc. A processing unit may include be one or more processors, including single core or multicore processors, one or more cores of processors, or combinations thereof. In some embodiments, processing subsystem 1604 can include one or more special purpose co-processors such as graphics processors, digital signal processors (DSPs), or the like. In some embodiments, some or all of the processing units of processing subsystem 1604 can be implemented using customized circuits, such as application specific integrated circuits (ASICs), or field programmable gate arrays (FPGAs).

In some embodiments, the processing units in processing subsystem 1604 can execute instructions stored in system memory 1610 or on computer readable storage media 1622. In various embodiments, the processing units can execute a variety of programs or code instructions and can maintain multiple concurrently executing programs or processes. At any given time, some or all of the program code to be executed can be resident in system memory 1610 and/or on computer-readable storage media 1610 including potentially on one or more storage devices. Through suitable programming, processing subsystem 1604 can provide various functionalities described above for dynamically modifying documents (e.g., webpages) responsive to usage patterns.

In certain embodiments, a processing acceleration unit 1606 may be provided for performing customized processing or for off-loading some of the processing performed by processing subsystem 1604 so as to accelerate the overall processing performed by computer system 1600.

I/O subsystem 1608 may include devices and mechanisms for inputting information to computer system 1600 and/or for outputting information from or via computer system 1600. In general, use of the term "input device" is intended to include all possible types of devices and mechanisms for inputting information to computer system 1600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1618 provides a repository or data store for storing information that is used by computer system 1600. Storage subsystem 1618 provides a tangible non-transitory computer-readable storage medium for storing the basic programming and data constructs that provide the functionality of some embodiments. Software (programs, code modules, instructions) that when executed by processing subsystem 1604 provide the functionality described above may be stored in storage subsystem 1618. The software may be executed by one or more processing units of processing subsystem 1604. Storage subsystem 1618 may also provide a repository for storing data used in accordance with the present disclosure.

Storage subsystem 1618 may include one or more non-transitory memory devices, including volatile and non-volatile memory devices. As shown in FIG. 16, storage subsystem 1618 includes a system memory 1610 and a computer-readable storage media 1622. System memory 1610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1600, such as during start-up, may be stored in the ROM. The RAM may contain data and/or program modules that are presently being operated and executed by processing subsystem 1604. In some implementations, system memory 1610 may include multiple different types of memory, such as static random access memory (SRAM) or dynamic random access memory (DRAM).

By way of example, and not limitation, as depicted in FIG. 16, system memory 1610 may store application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1622 may store programming and data constructs that provide the functionality of some embodiments. Software (programs, code modules, instructions) that when executed by processing subsystem 1604 a processor provide the functionality described above may be stored in storage subsystem 1618. By way of example, computer-readable storage media 1622 may include non-volatile memory such as a hard disk drive, a magnetic disk drive, an optical disk drive such as a CD ROM, DVD, a Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1622 may provide storage of computer-readable instructions, data structures, program modules, and other data for computer system 1600.

In certain embodiments, storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for storing computer-readable information.

In certain embodiments, computer system 1600 may provide support for executing one or more virtual machines. Computer system 1600 may execute a program such as a hypervisor for facilitating the configuring and managing of the virtual machines. Each virtual machine may be allocated memory, compute (e.g., processors, cores), I/O, and networking resources. Each virtual machine may run its own operating system, which may be the same as or different from the operating systems executed by other virtual machines executed by computer system 1600. Accordingly, multiple operating systems may potentially be run concurrently by computer system 1600. Each virtual machine generally runs independently of the other virtual machines.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to establish a communication channel to one or more client devices via the Internet for receiving and sending information from and to the client devices. Additionally, communication subsystem 1624 may be used to communicate notifications of successful logins or notifications to re-enter a password from the privileged account manager to the requesting users.

Communication subsystem 1624 may support both wired and/or wireless communication protocols. For example, in certain embodiments, communications subsystem 1624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

Communication subsystem 1624 can receive and transmit data in various forms. For example, in some embodiments, communications subsystem 1624 may receive input communication in the form of structured and/or unstructured data feeds 1626, event streams 1628, event updates 1630, and the like. For example, communications subsystem 1624 may be configured to receive (or send) data feeds 1626 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1624 may be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1600 depicted in FIG. 16 is intended only as a specific example. Many other configurations having more or fewer components than the system depicted in FIG. 16 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, California, may offer various types of cloud services including but not limited to one or more services provided under Software as a Service (Saas) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services may facilitate the management and control of the underlying computing resources, such as storage, networks, and other fundamental computing resources for customers utilizing services provided by the SaaS platform and the PaaS platform.

FIG. 17 is a simplified block diagram of one or more components of a system environment 1700 by which services provided by one or more components of an embodiment system may be offered as cloud services, in accordance with an embodiment of the present disclosure. In the illustrated embodiment, system environment 1700 includes one or more client computing devices 1704, 1706, and 1708 that may be used by users to interact with a cloud infrastructure system 1702 that provides cloud services. The client computing devices may be configured to operate a client application such as a web browser, a proprietary client application (e.g., Oracle Forms), or some other application, which may be used by a user of the client computing device to interact with cloud infrastructure system 1702 to use services provided by cloud infrastructure system 1702.

It should be appreciated that cloud infrastructure system 1702 depicted in the figure may have other components than those depicted. Further, the embodiment shown in the figure is only one example of a cloud infrastructure system that may incorporate an embodiment of the disclosure. In some other embodiments, cloud infrastructure system 1702 may have more or fewer components than shown in the figure, may combine two or more components, or may have a different configuration or arrangement of components.

Client computing devices 1704, 1706, and 1708 may be devices similar to those described above for 1502, 1504, 1506, and 1508.

Although example system environment 1700 is shown with three client computing devices, any number of client computing devices may be supported. Other devices such as devices with sensors, etc. may interact with cloud infrastructure system 1702.

Network(s) 1710 may facilitate communications and exchange of data between clients 1704, 1706, and 1708 and cloud infrastructure system 1702. Each network may be any type of network familiar to those skilled in the art that can support data communications using any of a variety of commercially-available protocols, including those described above for network(s) 1710.

Cloud infrastructure system 1702 may comprise one or more computers and/or servers that may include those described above for server 1712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." In a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1702 may be adapted to automatically provision, manage and track a customer's subscription to services offered by cloud infrastructure system 1702. Cloud infrastructure system 1702 may provide the cloud services via different deployment models. For example, services may be provided under a public cloud model in which cloud infrastructure system 1702 is owned by an organization selling cloud services (e.g., owned by Oracle) and the services are made available to the general public or different industry enterprises. As another example, services may be provided under a private cloud model in which cloud infrastructure system 1702 is operated solely for a single organization and may provide services for one or more entities within the organization. The cloud services may also be provided under a community cloud model in which cloud infrastructure system 1702 and the services provided by cloud infrastructure system 1702 are shared by several organizations in a related community. The cloud services may also be provided under a hybrid cloud model, which is a combination of two or more different models.

In some embodiments, the services provided by cloud infrastructure system 1702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1702. Cloud infrastructure system 1702 then performs processing to provide the services in the customer's subscription order.

In some embodiments, the services provided by cloud infrastructure system 1702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1702 may also include infrastructure resources 1730 for providing the resources used to provide various services to customers of the cloud infrastructure system. In one embodiment, infrastructure resources 1730 may include pre-integrated and optimized combinations of hardware, such as servers, storage, and networking resources to execute the services provided by the PaaS platform and the SaaS platform.

In some embodiments, resources in cloud infrastructure system 1702 may be shared by multiple users and dynamically re-allocated per demand. Additionally, resources may be allocated to users in different time zones. For example, cloud infrastructure system 1730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1732 may be provided that are shared by different components or modules of cloud infrastructure system 1702 and by the services provided by cloud infrastructure system 1702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1702, and the like.

In one embodiment, as depicted in the figure, cloud management functionality may be provided by one or more modules, such as an order management module 1720, an order orchestration module 1722, an order provisioning module 1724, an order management and monitoring module 1726, and an identity management module 1728. These modules may include or be provided using one or more computers and/or servers, which may be general purpose computers, specialized server computers, server farms, server clusters, or any other appropriate arrangement and/or combination.

In example operation 1734, a customer using a client device, such as client device 1704, 1706 or 1708, may interact with cloud infrastructure system 1702 by requesting one or more services provided by cloud infrastructure system 1702 and placing an order for a subscription for one or more services offered by cloud infrastructure system 1702. In certain embodiments, the customer may access a cloud User Interface (UI), cloud UI 1712, cloud UI 1714 and/or cloud UI 1716 and place a subscription order via these UIs.

The order information received by cloud infrastructure system 1702 in response to the customer placing an order may include information identifying the customer and one or more services offered by the cloud infrastructure system 1702 that the customer intends to subscribe to.

After an order has been placed by the customer, the order information is received via the cloud UIs, 1712, 1714 and/or 1716.

At operation 1736, the order is stored in order database 1718. Order database 1718 can be one of several databases operated by cloud infrastructure system 1718 and operated in conjunction with other system elements.

At operation 1738, the order information is forwarded to an order management module 1720. In some instances, order management module 1720 may be configured to perform billing and accounting functions related to the order, such as verifying the order, and upon verification, booking the order.

At operation 1740, information regarding the order is communicated to an order orchestration module 1722. Order orchestration module 1722 may utilize the order information to orchestrate the provisioning of services and resources for the order placed by the customer. In some instances, order orchestration module 1722 may orchestrate the provisioning of resources to support the subscribed services using the services of order provisioning module 1724.

In certain embodiments, order orchestration module 1722 enables the management of business processes associated with each order and applies business logic to determine whether an order should proceed to provisioning. At operation 1742, upon receiving an order for a new subscription, order orchestration module 1722 sends a request to order provisioning module 1724 to allocate resources and configure those resources needed to fulfill the subscription order. Order provisioning module 1724 enables the allocation of resources for the services ordered by the customer. Order provisioning module 1724 provides a level of abstraction between the cloud services provided by cloud infrastructure system 1700 and the physical implementation layer that is used to provision the resources for providing the requested services. Order orchestration module 1722 may thus be isolated from implementation details, such as whether or not services and resources are actually provisioned on the fly or pre-provisioned and only allocated/assigned upon request.

At operation 1744, once the services and resources are provisioned, a notification of the provided service may be sent to customers on client devices 1704, 1706 and/or 1708 by order provisioning module 1724 of cloud infrastructure system 1702. At operation 1746, the customer's subscription order may be managed and tracked by an order management and monitoring module 1726. In some instances, order management and monitoring module 1726 may be configured to collect usage statistics for the services in the subscription order, such as the amount of storage used, the amount data transferred, the number of users, and the amount of system up time and system down time.

In certain embodiments, cloud infrastructure system 1700 may include an identity management module 1728. Identity management module 1728 may be configured to provide identity services, such as access management and authorization services in cloud infrastructure system 1700. In some embodiments, identity management module 1728 may control information about customers who wish to utilize the services provided by cloud infrastructure system 1702. Such information can include information that authenticates the identities of such customers and information that describes which actions those customers are authorized to perform relative to various system resources (e.g., files, directories, applications, communication ports, memory segments, etc.). Identity management module 1728 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A computer-implemented method, comprising:
   executing a cloud-computing orchestration service of a cloud-computing environment, the cloud-computing orchestration service being configured to provision infrastructure components and deploy images to provisioned infrastructure components based at least in part on identifying an automated workflow for modifying a current state of the cloud-computing environment to conform to a desired state expressed by declarative statements in a set of configuration files;
   receiving, by a computing component of the cloud-computing environment from the cloud-computing orchestration service, a send request comprising metadata corresponding to an image to be deployed to a secure computing region that is isolated from any public networks, the send request being initiated by the cloud-computing orchestration service based at least in part on detecting a modification in at least one of the set of configuration files, and the secure computing region comprising a component that restricts data from being transmitted to destinations outside of the secure computing region;

obtaining, by the computing component from the cloud-computing environment, the image to be deployed to the secure computing region based at least in part on the metadata;

segmenting, by the computing component, the image into a plurality of data packets with which the image is constructable, each of the plurality of data packets being individually associated with the metadata, the metadata indicating a destination for the image within the secure computing region; and transmitting, to a first data diode endpoint device of the cloud-computing environment for transmission to a second data diode endpoint device of the secure computing region, the plurality of data packets comprising the image and the metadata corresponding to the image, wherein transmitting the plurality of data packets enables a corresponding computing component of the secure computing region to perform one or more orchestration tasks to deploy the image within the secure computing region.

2. The computer-implemented method of claim 1, wherein the second data diode endpoint device restricts reception to a restricted set of file types.

3. The computer-implemented method of claim 1, wherein the first data diode endpoint device comprises a specialized sending card and the second data diode endpoint device comprises a specialized receiving card, and wherein the specialized sending card is connected by an optical transmit only cable to the specialized receiving card.

4. The computer-implemented method of claim 3, wherein the plurality of data packets are transmitted via the optical transmit only cable.

5. The computer-implemented method of claim 1, further comprising digitally signing the metadata to include a digital signature, wherein at least one component of the secure computing region verifies the digital signature as part of reconstructing the image.

6. The computer-implemented method of claim 1, wherein the metadata is received in a configuration file comprising declarative statements expressing a corresponding desired state for the secure computing region.

7. The computer-implemented method of claim 1, wherein the metadata comprises a manifest, the computer-implemented method further comprising modifying the manifest to include a checksum corresponding to a respective data packet of the plurality of data packets and a number corresponding to the respective data packet of the plurality of data packets, wherein the respective data packet is validated in the secure computing region based at least in part on the checksum, and wherein the image is reconstructed in the secure computing region based at least in part on the number corresponding to the respective data packet of the plurality of data packets.

8. The computer-implemented method of claim 1, wherein transmitting the plurality of data packets causes the component of the secure computing region to execute the one or more orchestration tasks to deploy the image within the secure computing region.

9. A computing system of a cloud-computing environment, comprising:

a cloud-computing orchestration service that provisions infrastructure components and deploy images to provisioned infrastructure components based at least in part on identifying an automated workflow for modifying a current state of the cloud-computing environment to conform to a desired state expressed by declarative statements in a set of configuration files;

a processor; and a memory storing instructions that, when executed by the processor, cause the computing system to:

receive a send request initiated by the cloud-computing orchestration service based at least in part on detecting a modification in at least one of the set of configuration files, the send request comprising metadata corresponding to an image to be deployed to a secure computing region that is isolated from any public networks, and the secure computing region comprising a component that restricts data from being transmitted to destinations outside of the secure computing region;

obtain the image to be deployed to the secure computing region based at least in part on the metadata;

segment the image into a plurality of data packets with which the image can be constructed, each of the plurality of data packets being individually associated with the metadata, the metadata indicating a destination for the image within the secure computing region; and transmit, to a first data diode endpoint device of the cloud-computing environment for transmission to a second data diode endpoint device of the secure computing region, the plurality of data packets comprising the image and the metadata corresponding to the image, wherein transmitting the plurality of data packets enables a computing component of the secure computing region to perform one or more orchestration tasks to deploy the image within the secure computing region.

10. The computing system of claim 9, wherein the second data diode endpoint device restricts reception to a restricted set of file types.

11. The computing system of claim 9, wherein executing the instructions further causes the computer system to digitally sign the metadata to include a digital signature, and wherein at least one component of the secure computing region verifies the digital signature as part of constructing the image.

12. The computing system of claim 9, wherein the metadata comprises a manifest, wherein executing the instructions causes the one or more processors to modify the manifest to include a checksum corresponding to a respective data packet of the plurality of data packets and a number corresponding to the respective data packet of the plurality of data packets, wherein the respective data packet is validated in the secure computing region based at least in part on the checksum, and wherein the image is reconstructed in the secure computing region based at least in part on the number corresponding to the respective data packet of the plurality of data packets.

13. The computing system of claim 9, wherein the first data diode endpoint device comprises a specialized sending card and the second data diode endpoint device comprises a specialized receiving card, and wherein the specialized sending card is connected by an optical transmit only cable to the specialized receiving card.

14. The computing system of claim 13, wherein the plurality of data packets are transmitted via the optical transmit only cable.

15. A non-transitory computer-readable medium, the computer-readable medium including instructions that when executed by one or more processors of a computing system of a cloud-computing environment, cause the computing system to:

execute a cloud-computing orchestration service configured to provision infrastructure components and deploy images to provisioned infrastructure components based at least in part on identifying an automated workflow for modifying a current state of the cloud-computing environment to conform to a desired state expressed by declarative statements in a set of configuration files;

receive a send request initiated by the cloud-computing orchestration service based at least in part on detecting a modification in at least one of the set of configuration files, the send request comprising metadata corresponding to an image to be deployed to a secure computing region that is isolated from any public networks, the secure computing region comprising a component that restricts data from being transmitted to destinations outside of the secure computing region;

obtain the image to be deployed to the secure computing region based at least in part on the metadata;

segment the image into a plurality of data packets with which the image can be constructed, each of the plurality of data packets being individually associated with the metadata, the metadata indicating a destination for the image within the secure computing region; and transmit, to a first data diode endpoint device of the cloud-computing environment for transmission to a second data diode endpoint device of the secure computing region, the plurality of data packets comprising the image and the metadata corresponding to the image, wherein transmitting the plurality of data packets enables a computing component of the secure computing region to perform one or more orchestration tasks to deploy the image within the secure computing region.

16. The non-transitory computer-readable medium of claim 15, wherein the second data diode endpoint device restricts reception to a restricted set of file types.

17. The non-transitory computer-readable medium of claim 15, wherein the first data diode endpoint device comprises a specialized sending card and the second data diode endpoint device comprises a specialized receiving card, and wherein the specialized sending card is connected by an optical transmit only cable to the specialized receiving card, and wherein the plurality of data packets are transmitted via the optical transmit only cable.

18. The non-transitory computer-readable medium of claim 15, wherein executing the instructions further causes the computer system to digitally sign the metadata to include a digital signature, and wherein at least one component of the secure computing region verifies the digital signature as part of reconstructing the image.

19. The non-transitory computer-readable medium of claim 15, wherein the metadata comprises a manifest, wherein executing the instructions causes the one or more processors to modify the manifest to include a checksum corresponding to a respective data packet of the plurality of data packets and a number corresponding to the respective data packet of the plurality of data packets, wherein the respective data packet is validated in the secure computing region based at least in part on the checksum, and wherein the image is reconstructed in the secure computing region based at least in part on the number corresponding to the respective data packet of the plurality of data packets.

* * * * *

UNITED STATES PATENT AND TRADEMARK OFFICE
CERTIFICATE OF CORRECTION

| | |
|---|---|
| PATENT NO. | : 12,149,509 B2 |
| APPLICATION NO. | : 17/152610 |
| DATED | : November 19, 2024 |
| INVENTOR(S) | : Kiyanclar et al. |

Page 1 of 1

It is certified that error appears in the above-identified patent and that said Letters Patent is hereby corrected as shown below:

In the Specification

In Column 1, Line 55, delete "packets," and insert -- packets. --, therefor.

In Column 3, Line 6, delete "like)." and insert -- like. --, therefor.

In Column 10, Line 11, delete "nodes" and insert -- nodes. --, therefor.

In Column 10, Line 13, delete "available" and insert -- available. --, therefor.

In Column 10, Line 15, delete "clients" and insert -- clients. --, therefor.

In Column 16, Line 58, delete "diode" and insert -- diode. --, therefor.

In Column 17, Line 34, delete "We" after -- boundaries. --.

In Column 17, Line 40, delete "transfers" and insert -- transfers. --, therefor.

In Column 22, Line 24, delete "FIG. 6." and insert -- FIG. 6 --, therefor.

In Column 35, Line 20, delete "(Saas)" and insert -- (SaaS) --, therefor.

Signed and Sealed this
Eleventh Day of February, 2025

Coke Morgan Stewart
*Acting Director of the United States Patent and Trademark Office*